(12) United States Patent
Choi et al.

(10) Patent No.: US 12,068,531 B2
(45) Date of Patent: Aug. 20, 2024

(54) WEARABLE ELECTRONIC DEVICE INCLUDING VARIABLE GROUND

(71) Applicant: SAMSUNG ELECTRONICS CO., LTD., Suwon-si (KR)

(72) Inventors: Nakchung Choi, Suwon-si (KR); Chankyu An, Suwon-si (KR); Gyusub Kim, Suwon-si (KR); Jaebong Chun, Suwon-si (KR); Jaewon Choe, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 30 days.

(21) Appl. No.: 18/094,903

(22) Filed: Jan. 9, 2023

(65) Prior Publication Data

US 2023/0163449 A1    May 25, 2023

Related U.S. Application Data

(63) Continuation of application No. PCT/KR2022/013511, filed on Sep. 8, 2022.

(30) Foreign Application Priority Data

Nov. 5, 2021  (KR) .................. 10-2021-0151523
Dec. 13, 2021 (KR) .................. 10-2021-0177533

(51) Int. Cl.
*H01Q 1/27*  (2006.01)
*H01Q 1/48*  (2006.01)
*H04M 1/05*  (2006.01)

(52) U.S. Cl.
CPC .............. *H01Q 1/273* (2013.01); *H01Q 1/48* (2013.01); *H04M 1/05* (2013.01)

(58) Field of Classification Search
CPC .......... H01Q 1/273; H01Q 1/48; H01Q 3/247; H04M 1/05
See application file for complete search history.

(56) References Cited

U.S. PATENT DOCUMENTS 10,547,946 B2    1/2020  Lee et al.
10,998,615 B1 *  5/2021  van Erven ............. H04R 1/105
(Continued)

FOREIGN PATENT DOCUMENTS

CN    206639913 U    11/2017
JP    2013090061 A    5/2013
(Continued)

OTHER PUBLICATIONS

International Search Report with Written Opinion issued in International Application No. PCT/KR2022/013511; International Filing Date Sep. 8, 2022; Date of Mailing Dec. 9, 2022 (9 pages).

*Primary Examiner* — Wilson Lee
(74) *Attorney, Agent, or Firm* — CANTOR COLBURN LLP

(57) ABSTRACT

A wearable electronic device includes a front with a lens connected thereto, and includes a first metal portion. A first leg is connected to one end of the front through a first hinge, and includes a second metal portion. A second leg is connected to the other end of the front through a second hinge. A printed circuit board (PCB) includes a ground portion electrically connected to the first metal portion and/or the second metal portion. An antenna structure includes a radiating element and a feeder electrically connected to the radiating element. The antenna structure is electrically connected to the ground portion. A first switch circuit is configured to electrically connect or disconnect the first metal portion and the second metal portion and is also configured to change an impedance for connecting the first (Continued)

metal portion and the second metal portion. A controller controls the first switch circuit.

20 Claims, 17 Drawing Sheets

(56) References Cited

U.S. PATENT DOCUMENTS

| | | | |
|---|---|---|---|
| 11,095,021 | B2 | 8/2021 | Sung et al. |
| 2014/0240474 | A1 | 8/2014 | Kondo |
| 2016/0204839 | A1 | 7/2016 | Liu et al. |
| 2017/0237149 | A1* | 8/2017 | Lee ................... G06F 1/1626 361/679.21 |
| 2018/0212314 | A1 | 7/2018 | Rautio |
| 2019/0198982 | A1* | 6/2019 | Moore ................ H01Q 1/273 |
| 2020/0195287 | A1* | 6/2020 | Olgun ................ H01Q 7/00 |

FOREIGN PATENT DOCUMENTS

| | | |
|---|---|---|
| JP | 5576948 B2 | 8/2014 |
| KR | 20120006963 A | 1/2012 |
| KR | 20160071572 A | 6/2016 |
| KR | 20170091692 A | 8/2017 |
| KR | 20180024336 A | 3/2018 |
| KR | 101919802 B1 | 11/2018 |
| KR | 20190120349 A | 10/2019 |

\* cited by examiner

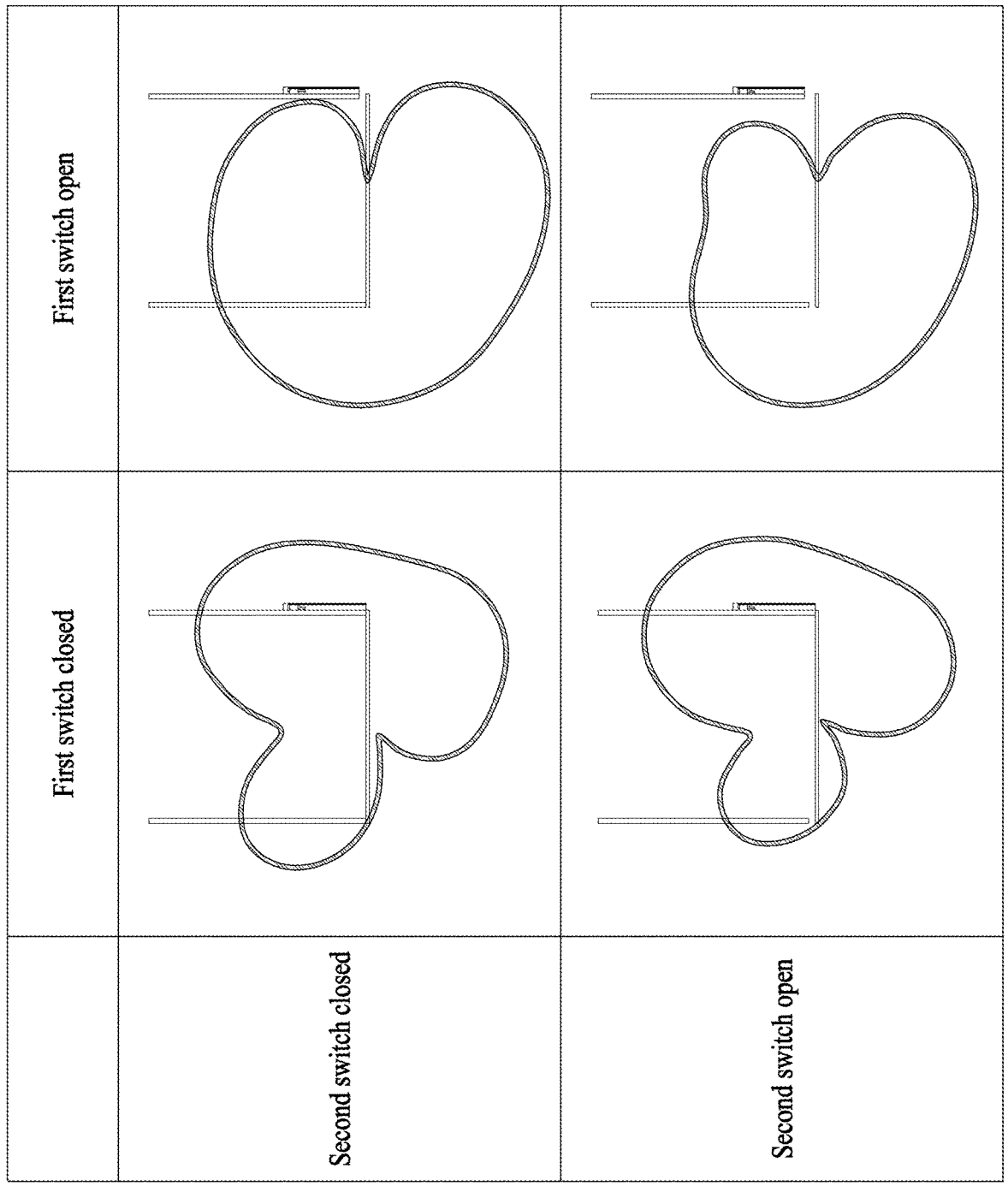

WEARABLE ELECTRONIC DEVICE INCLUDING VARIABLE GROUND

CROSS-REFERENCE TO RELATED APPLICATIONS

This application is a continuation application of International Application No. PCT/KR2022/013511 designating the United States, filed on Sep. 8, 2022, in the Korean Intellectual Property Receiving Office and claiming priority to Korean Patent Application No. 10-2021-0177533, filed on Dec. 13, 2021 Korean Patent Application No. 10-2021-0151523, filed on Nov. 5, 2021, and in the Korean Intellectual Property Office, the disclosures of which are incorporated by reference herein in their entireties.

BACKGROUND

1. Field

Various embodiments of the present disclosure relate to a wearable electronic device including a variable ground.

2. Description of Related Art

Various wearable electronic devices for providing an augmented reality (AR) service are available in the market. An AR service is a service of superimposing a virtual image having supplementary information on a real-world image seen by a user and showing the superimposition result, and may provide a user with a virtual object image including content related to a real object identified from the real-world image. An electronic device providing an AR service may operate while worn by a user. For example, wearable electronic devices may include an eye glasses-type electronic device that is mounted on the head of a user and allows the user to view virtual objects provided by an AR service.

SUMMARY

An antenna in an eye glasses-type wearable electronic device may be implemented using a frame. In general, an antenna is fixed and connected to a frame. Thus, a substantially uniform radiation pattern is generated. A uniform radiation pattern may cause a lack of adaptability of a user to various communication environments.

Various embodiments solve the limitations of substantially uniform radiation patterns generated by conventional wearable electronic AR device by providing a wearable electronic AR device that generates various radiation patterns to improve adaptability in various communication environments.

Various embodiments may implement a variable ground by utilizing metal portions of a frame.

In various embodiments, a wearable electronic device 400 may include: a frame including a front, a first leg, a second leg, and at least one metal portion; the front 411 with a lens 414 connected thereto, and including a first metal portion 4111 among the at least one metal portion; the first leg 412 connected to one end of the front 411 through a first hinge 421, and including a second metal portion 4121 among the at least one metal portion; the second leg 413 connected to an other end of the front 411 through a second hinge 422; a PCB 430 including a ground portion 431 electrically connected to the first metal portion 4111 or the second metal portion 4121; an antenna structure 440 including a radiating element 441 and a feeder 442 electrically connected to the radiating element 441; a first switch circuit 451 configured to electrically connect or disconnect the first metal portion 4111 and the second metal portion 4121 or to change an impedance for connecting the first metal portion 4111 and the second metal portion 4121; and a controller 460 configured to control the first switch circuit 451.

In various embodiments, a wearable electronic device 400 may include: a frame including a front, a first leg, a second leg, and at least one metal portion; the front 411 with a lens 414 connected thereto, and including a first metal portion 4111 among the at least one metal portion; the first leg 412 connected to one end of the front 411 through a first hinge 421, and including a second metal portion 4121 among the at least one metal portion; the second leg 413 connected to an other end of the front 411 through a second hinge 422; a PCB 430 including a ground portion 431 electrically connected to the first metal portion 4111, the PCB 430 positioned inside the first leg 412; an antenna structure 440 including a radiating element 441 and a feeder 442 electrically connected to the radiating element 441; a first switch circuit 451 configured to electrically connect or disconnect the first metal portion 4111 and the second metal portion 4121; and a controller 460 configured to control the first switch circuit 451.

According to various embodiments, it is possible to change the length of a ground using metal portions of a frame.

According to various embodiments, it is possible to generate various radiation patterns using a variable ground.

According to various embodiments, it is possible to improve adaptability in various communication environments and improve communication quality.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 4F is simulation data illustrating radiation patterns of a signal radiated according to states of a first switch circuit and a second switch circuit in an unfolded state of a wearable electronic device according to an embodiment;

DETAILED DESCRIPTION

Figure 1:
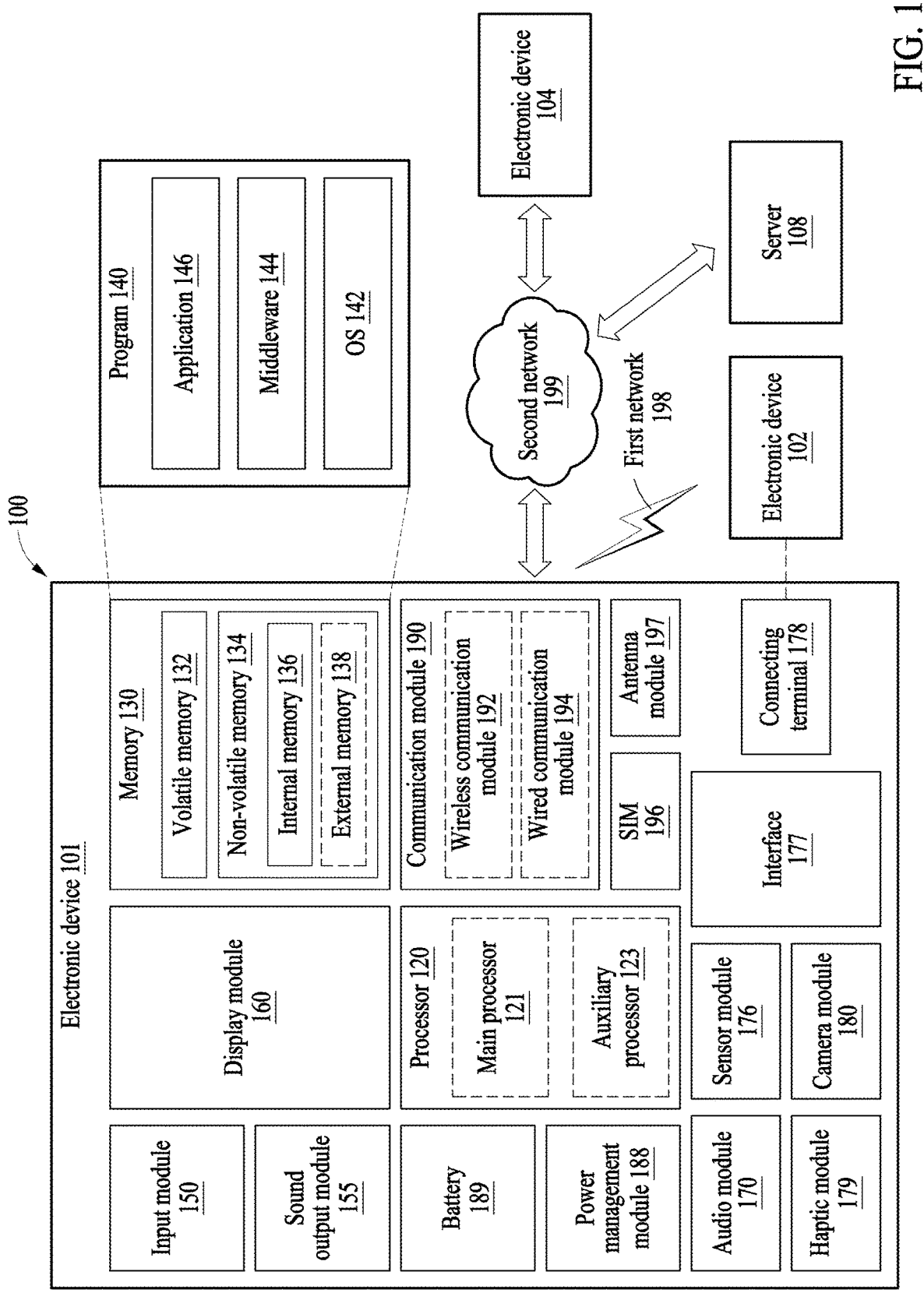
FIG. 1 is a block diagram of an electronic device in a network environment according to various embodiments.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added in the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a portion of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a portion of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. An AI model may be generated by machine learning. Such learning may be performed by, for example, the electronic device 101 in which an artificial intelligence model is executed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a portion of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an embodiment, the display module 160 may include a touch sensor adapted to sense a touch, or a pressure sensor adapted to measure an intensity of a force incurred by the touch.

The audio module 170 may convert a sound into an electrical signal or vice versa. According to an embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a portion of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a portion of the antenna module 197.

According to various embodiments, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least portion of the function or the service. The one or more external electronic devices receiving the request may perform the at least portion of the function or the service requested, or an additional function or an additional service related to the request, and may transfer an outcome of the performing to the electronic device 101. The electronic device 101 may provide the outcome, with or without further processing of the outcome, as at least portion of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In one embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
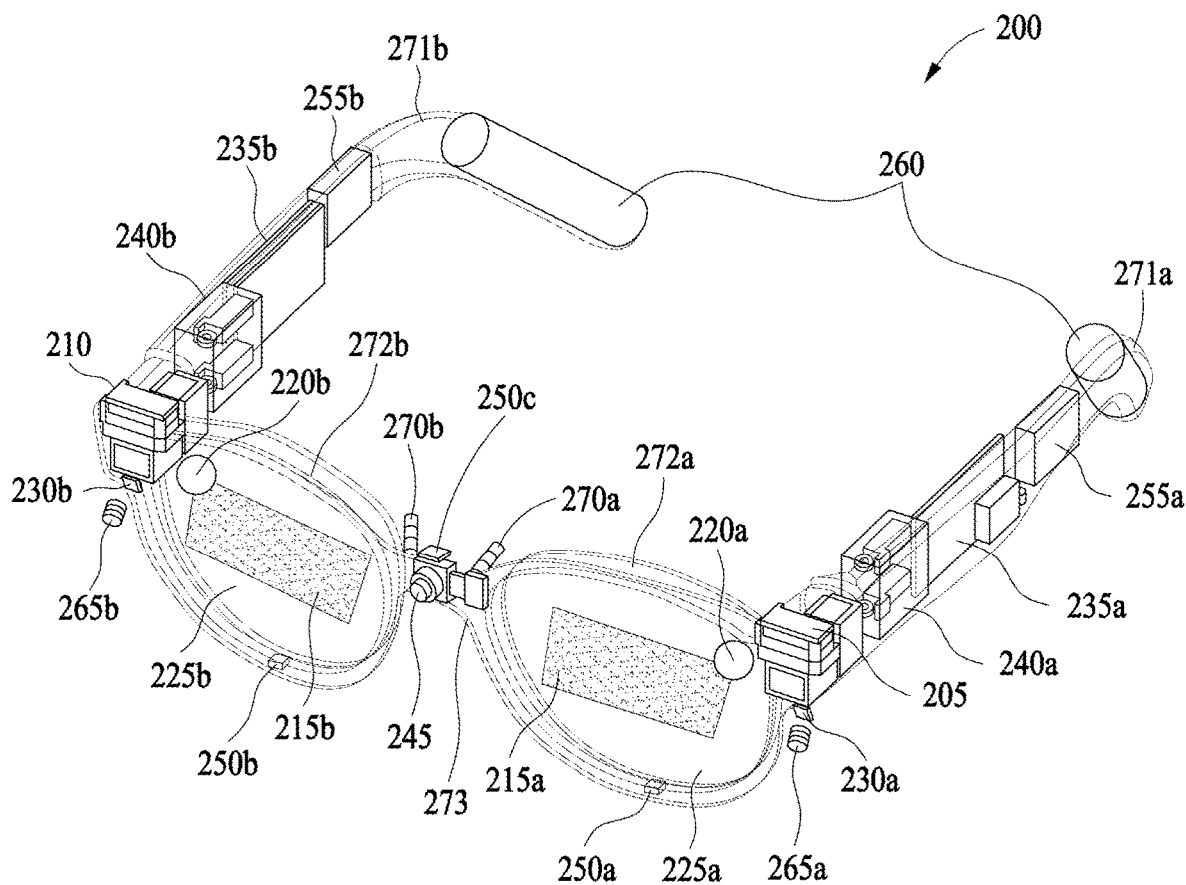
FIG. 2 is a view illustrating a structure of a wearable electronic device according to an embodiment.

FIG. 2 is a view illustrating a structure of a wearable electronic device according to an embodiment.

Referring to FIG. 2, a wearable electronic device 200 (e.g., the electronic device 101 or 102 of FIG. 1) may be worn on a face of a user to provide the user with an image associated with an augmented reality (AR) service and/or a virtual reality (VR) service.

In one embodiment, the wearable electronic device 200 may include a first display 205, a second display 210, screen display portions 215a and 215b, input optical members 220a and 220b, a first transparent member 225a, a second transparent member 225b, lighting units 230a and 230b, a first board 235a, a second board 235b, a first hinge 240a, a second hinge 240b, an imaging camera 245, a plurality of microphones (e.g., a first microphone 250a, a second microphone 250b, and a third microphone 250c), a plurality of speakers (e.g., a first speaker 255a, and a second speaker 255b), a battery 260, a first recognition camera 265a, a second recognition camera 265b, a first eye detection camera 270a, a second eye detection camera 270b, temples 271a and 271b, rims 272a and 272b, and a bridge 273.

In one embodiment, a display (e.g., the first display 205 and the second display 210) may include, for example, a liquid crystal display (LCD), a digital mirror device (DMD), or a liquid crystal on silicon (LCoS), an organic light-emitting diode (OLED), a micro light-emitting diode (micro LED), or the like. Although not shown in the drawings, when the display 205, 210 is one of an LCD, a DMD, and an LCoS, the wearable electronic device 200 may include a light source configured to emit light to a screen output area of the display 205, 210. In one embodiment, when the display 205, 210 is capable of generating light by itself, for example, when the display 205, 210 is either an OLED or a micro-LED, the wearable electronic device 200 may provide a virtual image with a relatively high quality to the user even though a separate light source is not included. For example, when the display 205, 210 is implemented as an OLED or a micro-LED, a light source may be unnecessary, and accordingly the wearable electronic device 200 may be lightened. Hereinafter, the display 205, 210 capable of generating light by itself may be referred to as a "self-luminous display", and description will be made on the assumption of the self-luminous display.

The display 205, 210 according to various embodiments may include at least one micro-LED. For example, the micro LED may express red (R), green (G), and blue (B) by emitting light by itself, and a single chip may implement a single pixel (e.g., one of R, G, and B pixels) because the micro LED is relatively small in size (e.g., 100 µm or less). Accordingly, it may be possible to provide a high resolution without a backlight unit (BLU), when the display 205, 210 is implemented as a micro-LED. However, embodiments are not limited thereto, and a single chip may be implemented by a plurality of pixels including R, G, and B pixels. The display 205, 210 may also be referred to as a "light source".

In one embodiment, the display 205, 210 may include pixels for displaying a virtual image. The display 205, 210 may further include infrared pixels that emit infrared light.

Figure 3:
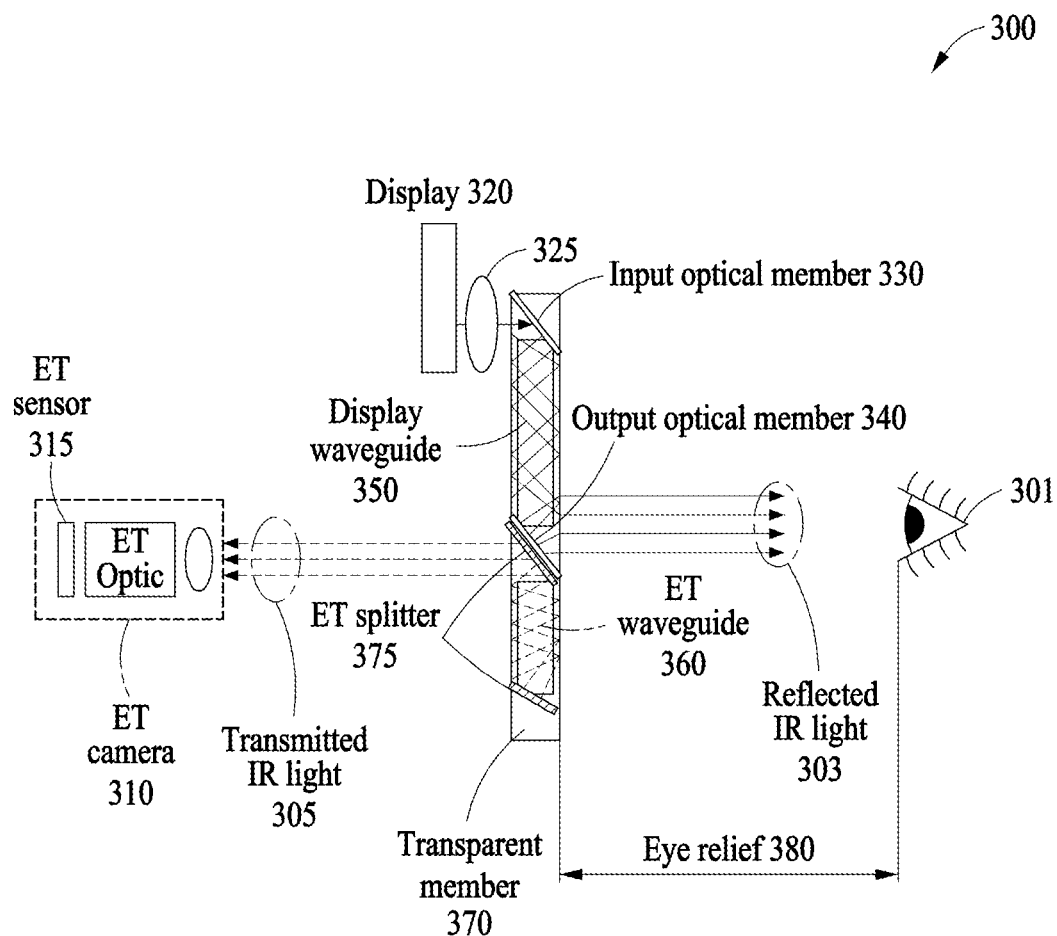
FIG. 3 is a diagram illustrating an operation of an eye tracking camera included in a wearable electronic device according to an embodiment.

In one embodiment, the display 205, 210 may further include light-receiving pixels (e.g., photo sensor pixels) that are disposed between pixels and configured to receive light reflected from eyes of a user, convert the received light to electrical energy, and output the electrical energy. Referring to FIG. 3, for example, a light-receiving pixel may be referred to as an "eye tracking sensor". The eye tracking sensor (e.g., an eye tracking sensor 315 of FIG. 3) may sense infrared light generated by reflecting light emitted by an infrared pixel included in the display 205, 210 by eyes of a user.

The wearable electronic device 200 may detect a gaze direction (e.g., a movement of a pupil) of the user, using light receiving pixels 315. For example, the wearable electronic device 200 may detect and track a gaze direction of a left eye and a gaze direction of a right eye of the user through one or more light-receiving pixels 315 of the first display 205 and one or more light-receiving pixels 315 of the second display 210. The wearable electronic device 200 may also determine a central position of a virtual image according to the gaze directions of the left eye and the right eye of the user (e.g., directions in which pupils of the left eye and the right eye of the user gaze) detected through the one or more light-receiving pixels 315.

With continued reference to FIGS. 2 and 4, the wearable electronic device 200 may include the display 205, 210, the first transparent member 225a and/or the second transparent member 225b. A user may use the wearable electronic device 200 while wearing the wearable electronic device 200 on his or her face. According to an embodiment, the first transparent member 225a may be disposed to face the left eye of the user, and the second transparent member 225b may be disposed to face the right eye of the user. According to various embodiments, when the display 205, 210 is transparent, the display 205, 210 may be disposed to face an eye of the user to configure the screen display portion 215a, 215b.

The first display 205 and the second display 210 may each include a first control circuit (not shown). The first control circuit may control the first display 205 or the second display 210. The first control circuit may control an operation of a liquid crystal element of a transparent cover (not shown) included in the first display 205 or the second display 210. In one embodiment, light emitted from the display 205, 210 may reach the screen display portion 215a formed on the first transparent member 225a that faces the left eye of the user, and the screen display portion 215b formed on the second transparent member 225b that faces the right eye of the user, by passing through a lens (not shown) and a waveguide (e.g., a display waveguide 350 and an eye tracking waveguide 360 of FIG. 3).

The lens (not shown) may be disposed in front of the display 205, 210. The lens (not shown) may include a concave lens and/or a convex lens. For example, the lens (not shown) may include a projection lens (e.g., a projection lens 325 of FIG. 3), or a collimation lens (not shown).

In one embodiment, the light emitted from the display 205, 210 may be guided by the waveguide 350, 360 through the input optical member 220a, 220b. Light traveling in the waveguide 350, 360 may be guided toward the eyes of the user through the output optical member (e.g., the output optical member 340 of FIG. 3). The screen display portion 215a, 215b may be determined based on light emitted toward an eye of a user (e.g., an eye 301 of the user of FIG. 3).

For example, the light emitted from the display 205, 210 may be reflected from a grating area of the waveguide 350, 360 formed in the input optical member 220a, 220b and the screen display portion 215a, 215b, and may be transmitted to the eye 301 of the user.

In one embodiment, the screen display portion 215a, 215b or a transparent member (e.g., the first transparent member 225a, the second transparent member 225b) may include a reflective lens, and a lens including the waveguide 350, 360. The waveguide 350, 360 may function to transmit a light source generated by the display 205, 210 to an eye of the user, and may be referred to as an "optical waveguide". Hereinafter, an "optical waveguide" or "waveguide" may correspond to the screen display portion 215a, 215b.

The screen display portion 215a, 215b may be a path through which external light is incident, totally reflected, and emitted, and may be distinguished from the first transparent member 225a and the second transparent member 225b through which external light is simply reflected or transmitted.

In one embodiment, the screen display portion 215a, 215b may be formed of glass, plastic, or a polymer, and may have a nanopattern formed on one surface of the inside or outside, for example, a grating structure of a polygonal or curved shape. According to an embodiment, light incident to one end of the screen display portion 215a, 215b through the input optical member 220a, 220b may be propagated inside the display waveguide 350 by the nanopattern to be provided to the user. For example, the screen display portion 215a, 215b including a freeform prism may provide incident light to a user through a reflection mirror.

The screen display portion 215a, 215b may include at least one of a reflective element (e.g., a reflection mirror) and at least one diffractive element (e.g., a diffractive optical element (DOE) or a holographic optical element (HOE)). The screen display portion 215a, 215b may guide light emitted from a display (e.g., the first display 205 and the second display 210) to the eyes of the user, using the at least one diffractive element or the reflective element included in the screen display portion 215a, 215b.

According to various embodiments, the diffractive element may include the input optical member 220a, 220b and/or an output optical member (e.g., the output optical member 340 of FIG. 3). For example, the input optical member 220a, 220b may refer to an input grating area, and the output optical member 340 may refer to an output grating area. The input grating area may function as an input terminal to diffract (or reflect) light output from the display 205, 210 (e.g., a micro LED) to transmit the light to the screen display portion 215a, 215b. The output grating area may function as an exit to diffract (or reflect) light transmitted to the waveguide 350, 360 to the eye 301 of the user.

According to various embodiments, the reflective element may include a total reflection optical element or a total reflection waveguide for total internal reflection (TIR). For example, total reflection, which is one of schemes of inducing light, may form an angle of incidence such that light (e.g., a virtual image) entering through an input grating area is completely or almost completely reflected from one portion (e.g., a specific surface) of the screen display portion 215a, 215b, to completely or almost completely transmit the light to an output grating area.

The first transparent member 225a and/or the second transparent member 225b may be formed as, for example, a glass plate, a plastic plate, or a polymer, and may be transparently or translucently formed. According to an embodiment, the first transparent member 225a may be disposed to face the left eye of the user, and the second transparent member 225b may be disposed to face the right eye of the user.

According to one or more non-limiting embodiments, lighting unit 230a, 230b may be used differently according to the position in which the lighting unit 230a, 230b is attached. For example, the lighting unit 230a, 230b may be attached in the vicinity of the rim 272a, 272b of the wearable electronic device 200. The lighting unit 230a, 230b may be used as an auxiliary device for facilitating eye-gaze detection when pupils are captured using the eye tracking camera 270a, 270b. The lighting unit 230a, 230b may use an IR LED with a visible light wavelength or an infrared light wavelength.

Alternatively, the lighting unit 230a, 230b may be attached in the vicinity of a hinge (e.g., the first hinge 240a, the second hinge 240b) connecting the rim 272a, 272b and a temple 271a, 271b corresponding to a leg portion of glasses of the wearable electronic device 200 or in the vicinity of a camera (e.g., the first recognition camera 265a, the second recognition camera 265b) mounted adjacent to the bridge 273 connecting the rims 272a and 272b. Here, the camera 265a, 265b may be, for example, a global shutter (GS) camera, but is not limited thereto.

If image capturing is performed using a global shutter (GS) camera, the lighting unit 230a, 230b may be used to supplement a surrounding brightness. For example, the lighting unit 230a, 230b may be used in a dark environment or when it is not easy to detect a subject to be captured due to reflected light and mixing of various light sources.

In one embodiment, the lighting unit 230a, 230b may also be omitted. The lighting unit 230a, 230b may be replaced by infrared pixels included in the first display 205, the second display 210. In one embodiment, the lighting unit 230a, 230b may be included in the wearable electronic device 200 to assist infrared pixels included in the first display 205, the second display 210.

A PCB (e.g., the first board 235a, the second board 235b) may be disposed in the frame of the wearable electronic device 200 such as the temple 271a, 271b, for example, and transmit an electrical signal to each module (e.g., a camera, a display, an audio, or a sensor) and another PCB through a flexible printed circuit board (FPCB). According to various embodiments, at least one PCB may include the first board 235a, the second board 235b, and an interposer (not shown) disposed between the first board 235a and the second board 235b.

In one embodiment, a control circuit (not shown) for controlling components of the wearable electronic device 200 other than the first display 205, the second display 210 may be positioned on a PCB (e.g., the first board 235a, the second board 235b). The control circuit may control the components other than the first display 205, the second display 210 and perform an operation such as depth value estimation. The control circuit may include a communication circuit (e.g., the communication module 190 of FIG. 1) or a memory (e.g., the memory 130 of FIG. 1). The control circuit may control the first display 205, the second display 210, and/or the other components.

The hinge 240a, 240b may correspond to a portion connecting the temple 271a, 271b and the rim 272a, 272b of the wearable electronic device 200.

In one embodiment, the imaging camera 245 may be referred to as a "high resolution (HR)" or a "photo video (PV)", and may include a high-resolution camera. The imaging camera 245 may include a color camera having functions for obtaining a high-quality image, such as an automatic focus (AF) function and an optical image stabilizer (OIS). Embodiments are not limited thereto, and the imaging camera 245 may include a GS camera or a rolling shutter (RS) camera.

In one embodiment, a plurality of microphones (e.g., the first microphone 250a, the second microphone 250b, and the third microphone 250c) may process an external acoustic signal into electrical audio data. The processed audio data may be variously utilized according to a function (or an application being executed) being performed by the wearable electronic device 200.

In one embodiment, a plurality of speakers (e.g., the first speaker 255a and the second speaker 255b) may output audio data that is received from a communication circuit (e.g., the communication module 190 of FIG. 1) or stored in a memory (e.g., the memory 130 of FIG. 1).

In one embodiment, one or more batteries 260 may be included, and may supply power to the components constituting the wearable electronic device 200.

In one embodiment, the first recognition camera 265a and the second recognition camera 265b may include cameras used for three degrees of freedom (3DoF) and six degrees of freedom (6DoF) head tracking, hand detection and tracking, and gesture and/or space recognition. For example, the first recognition camera 265a and the second recognition camera 265b may each include a GS camera to detect a movement of a head or a hand and track the movement. For example, a stereo camera may be used for head tracking and space recognition, and accordingly two GS cameras with the same standard and performance may be used. An RS camera may be used to detect a quick hand movement and a minute movement of a finger and track a movement. In one embodiment, a GS camera having superior performance (e.g., image drag) in comparison to a camera may be mainly used. However, embodiments are not limited thereto. According to various embodiments, an RS camera may also be used. The first recognition camera 265a and the second recognition camera 265b may perform a simultaneous localization and mapping (SLAM) function through depth capturing and spatial recognition for 6DoF. In addition, the first recognition camera 265a and the second recognition camera 265b may perform a user gesture recognition function.

In one embodiment, at least one sensor (not shown, e.g., a gyro sensor, an acceleration sensor, a geomagnetic sensor, and/or a gesture sensor), the first recognition camera 265a, and the second recognition camera 265b may perform at least one of head tracking for 6DoF, pose estimation and prediction, gesture and/or space recognition, and a function of a SLAM through depth imaging.

In one embodiment, the first recognition camera 265a and the second recognition camera 265b may be classified and used as a camera for head tracking and a camera for hand tracking.

In one embodiment, the first eye tracking camera 270a and the second eye tracking camera 270b may detect and track pupils. The first eye tracking camera 270a and the second eye tracking camera 270b may be used so that the center of a virtual image projected on the wearable electronic device 200 may be positioned according to the gaze directions of the pupils of a user wearing the wearable electronic device 200. For example, as the first eye tracking camera 270a and the second eye tracking camera 270b, a GS camera may be mainly used to detect a pupil and track a fast pupil movement. The first eye tracking camera 270a may be installed to correspond to the left eye of the user, and the second eye tracking camera 270b may be installed to correspond to the right eye of the user. Here, the first eye tracking camera 270a and the second eye tracking camera 270b may have the same camera performance and specifications. However, embodiments are not limited thereto. The operation of an eye tracking camera (e.g., the first eye tracking camera 270a, the second eye tracking camera 270b) will be described in more detail with reference to FIG. 3 below.

FIG. 3 is a diagram illustrating an operation of an eye tracking (ET) camera included in a wearable electronic device according to an embodiment. FIG. 3 illustrates a process in which an eye tracking camera 310 (e.g., the first eye tracking camera 270a, the second eye tracking camera 270b of FIG. 2) of a wearable electronic device 300 according to an embodiment tracks the eye 301 of the user, that is, a gaze of the user, using light (e.g., infrared light) output from a display 320 (e.g., the first display 205, the second display 210 of FIG. 2).

The eye tracking camera 310 may include the eye tracking (ET) sensor 315. The eye tracking sensor 315 may be included inside the eye tracking camera 310. The eye tracking sensor 315 may detect first reflected light that is generated when reflected infrared light 303 is reflected from the eye 301 of the user. The eye tracking camera 310 may track the eye 301 of the user, that is, the gaze of the user, based on a detection result of the eye tracking sensor 315.

The display 320 may include a plurality of visible light pixels and a plurality of infrared pixels. The visible light pixels may include red (R), green (G), and blue (B) pixels. The visible light pixels may output visible light corresponding to a virtual object image. The infrared pixels may output infrared light. The display 320 may include, for example, micro LEDs, or OLEDs.

The wearable electronic device 300 may perform gaze tracking using the infrared light output from the display 320. The projection lens 325 may be disposed between the display 320 and an input optical member 330 (e.g., the input optical member 220a, 220b of FIG. 2).

The infrared light output from the display 320 may be incident on the input optical member 330 through the projection lens 325, and may be separated into the reflected infrared light 303 and transmitted infrared light 305 by a half mirror (not shown) included in the input optical member 330.

The half mirror may be formed in the entire area or a partial area of the input optical member 330. When the half mirror is formed in the entire area of the input optical member 330, the input optical member 330 may also be referred to as a "half mirror". The half mirror may be disposed in the input optical member 330 of the display waveguide 350. The half mirror may be disposed inside or below the input optical member 330. The half mirror may include a grating structure.

The half mirror may output reflected infrared light and transmitted infrared light in response to the infrared light output from the display 320. The half mirror may include a grating structure. The grating structure may output reflected infrared light directly toward the eye 301 of the user by reflecting a portion of the output infrared light, or may output the reflected infrared light 303 toward the eye 301 of the user through the output optical member 340 by passing through the display waveguide 350. Also, the grating structure may output the transmitted infrared light 305 by transmitting another portion of the output infrared light.

The reflected infrared light 303 may be output directly toward the eye 301 of the user. The reflected infrared light 303 may be output toward the eye 301 of the user through the output optical member 340 by passing through the display waveguide 350. The transmitted infrared light 305 may be output toward the real world. The transmitted infrared light 305 may be incident on a real object and may be partially reflected from the real object.

The display waveguide 350 and the eye tracking waveguide 360 may be included in a transparent member 370 (e.g., the first transparent member 225a, the second transparent member 225b of FIG. 2). The transparent member 370 may be formed as, for example, a glass plate, a plastic plate, or a polymer, and may be transparently or translucently formed. The transparent member 370 may be disposed to face an eye of a user. In this case, a distance between the transparent member 370 and the eye 301 of the user may be referred to as an "eye relief" 380.

The transparent member 370 may include the waveguides 350 and 360. The transparent member 370 may include the input optical member 330 and the output optical member 340. In addition, the transparent member 370 may include an eye tracking splitter 375 that splits the input light into several waveguides.

The display waveguide 350 is separate from the input optical member 330 as shown in FIG. 3. However, embodiments are not limited thereto. The input optical member 330 may also be included in the display waveguide 350.

In addition, the output optical member 340 is separate from the eye tracking waveguide 360 as shown in FIG. 3. However, embodiments are not limited thereto. The output optical member 340 may also be included in the eye tracking waveguide 360.

An optical waveguide (e.g., the display waveguide 350, the eye tracking waveguide 360) may output a virtual object image by adjusting a path of visible light. Visible light and infrared light output from the display 320 may be incident on the input optical member 330 through the projection lens 325. The visible light among the light incident on the input optical member 330 may be totally reflected through the display waveguide 350 to be guided to the output optical member 340. The visible light may be output from the output optical member 340 toward the eye 301 of the user.

The wearable electronic device 300 may reflect or transmit the infrared light output from the display 320 through the half mirror. In one embodiment, the wearable electronic device 300 may output the reflected infrared light 303 that is reflected by the half mirror (not shown) directly toward the eye 301 of the user, or may output the reflected infrared light 303 passing through the display waveguide 350 toward the eye 301 of the user. In one embodiment, the wearable electronic device 300 may output the transmitted infrared light 305 passing through the half mirror toward the real object. A reflectivity and a transmittance of the half mirror may be adjusted. For example, the half mirror may have a reflectivity of 30% (e.g., reflection toward eyes of a user) and a transmittance of 70% (e.g., output toward a real object) with respect to infrared light. However, the reflectivity and the transmittance are merely examples and may be adjusted in various ratios.

In one embodiment, the wearable electronic device 300 may output the reflected infrared light 303 toward eyes of the user through the half mirror and the infrared pixels included in the display 320. The reflected infrared light 303 may be reflected from the eye 301 of the user, and the eye tracking sensor 315 may detect the reflected light. The display 320 including the infrared pixels, and the half mirror included in the display waveguide 350 may be used instead of a separate infrared light source for detecting a real object. Since the separate infrared light source is not used, the wearable electronic device 300 may be lightened and power consumption may be reduced. In addition, the display 320 including the infrared pixels may function as an auxiliary light source to increase an image quality of a stereo camera (e.g., the first recognition camera 265a and the second recognition camera 265b of FIG. 2) in a low-illuminance environment and increase an accuracy of depth information.

Alternatively, the wearable electronic device 300 may output infrared light through the display 320 and detect light reflected from the real object through a stereo camera (e.g., the first recognition camera 265*a* and the second recognition camera 265*b* of FIG. 2). The wearable electronic device 300 may estimate a distance to the real object based on a detection result. For example, the wearable electronic device 300 may measure a depth value or use a time of flight (ToF) scheme to estimate the distance to the real object.

The wearable electronic device 300 (e.g., the wearable electronic device 200 of FIG. 2) may provide AR to a user. The wearable electronic device 300 may provide an image representing the real world through the transparent waveguide 360, while transferring a virtual object image output from the display 320 toward eyes of the user through the waveguide 350.

The wearable electronic device 300 may include, but is not limited to, for example, a head-mounted display (HMD), a face-mounted display (FMD), a smart eye glass-wear or a headset that provides extended reality such as AR, VR, or mixed reality.

According to an embodiment, the wearable electronic device 300 may output infrared light using the display 320 including the infrared pixels. The wearable electronic device 300 may track a gaze of a user, using the infrared light output from the display 320. In addition, the wearable electronic device 300 may estimate a distance to a real object, using the infrared light output from the display 320.

The electronic device according to various embodiments may be one of various types of electronic devices. The electronic device may include, for example, a portable communication device (e.g., a smart phone), a computer device, a portable multimedia device, a portable medical device, a camera, a wearable device, or a home appliance device. According to an embodiment of the disclosure, the electronic device is not limited to those described above.

It should be appreciated that various embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "at least one of A, B, or C", each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least portion of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 4A:
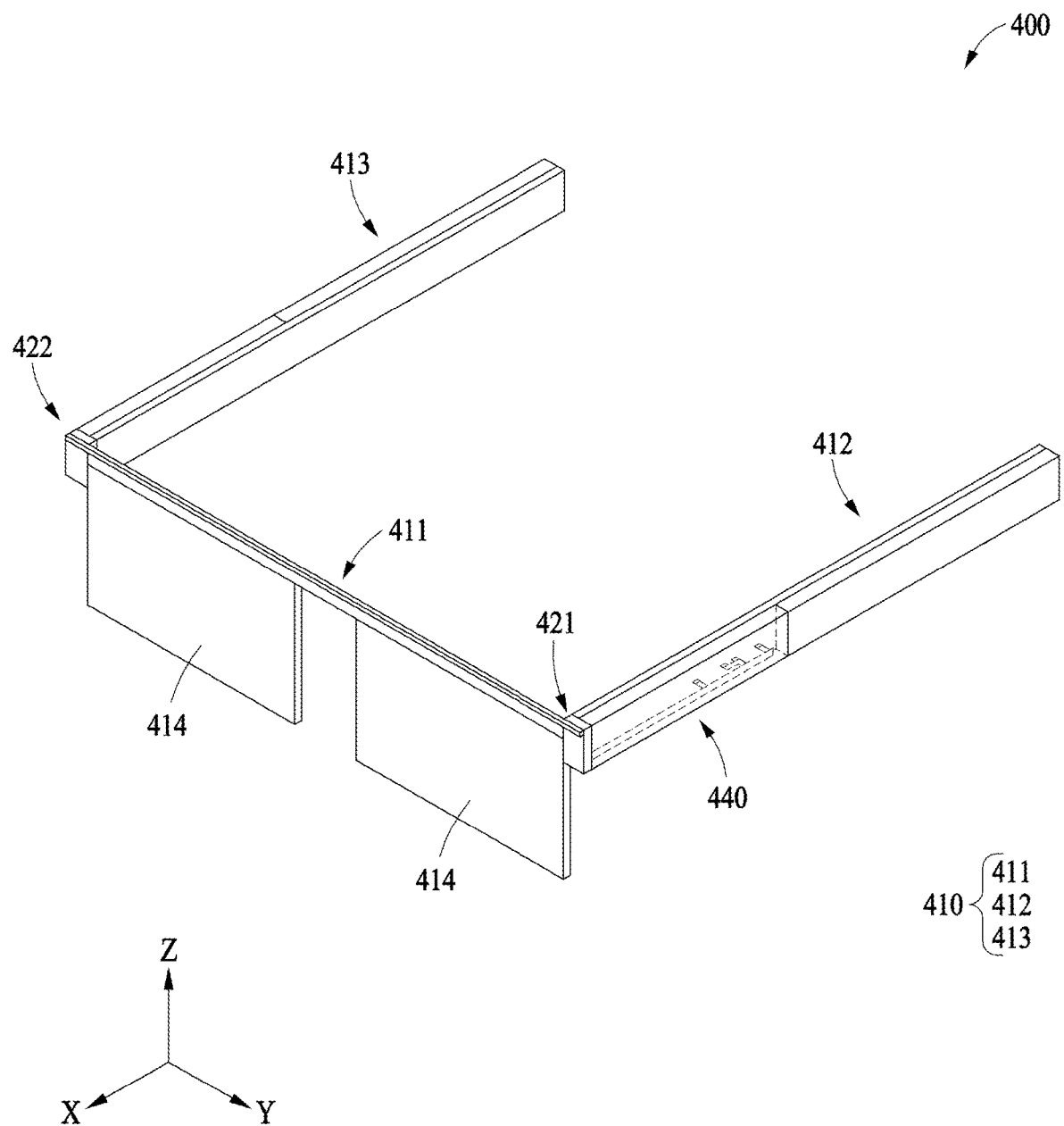
FIG. 4A is a perspective view schematically illustrating a wearable electronic device according to an embodiment.
Figure 4B:
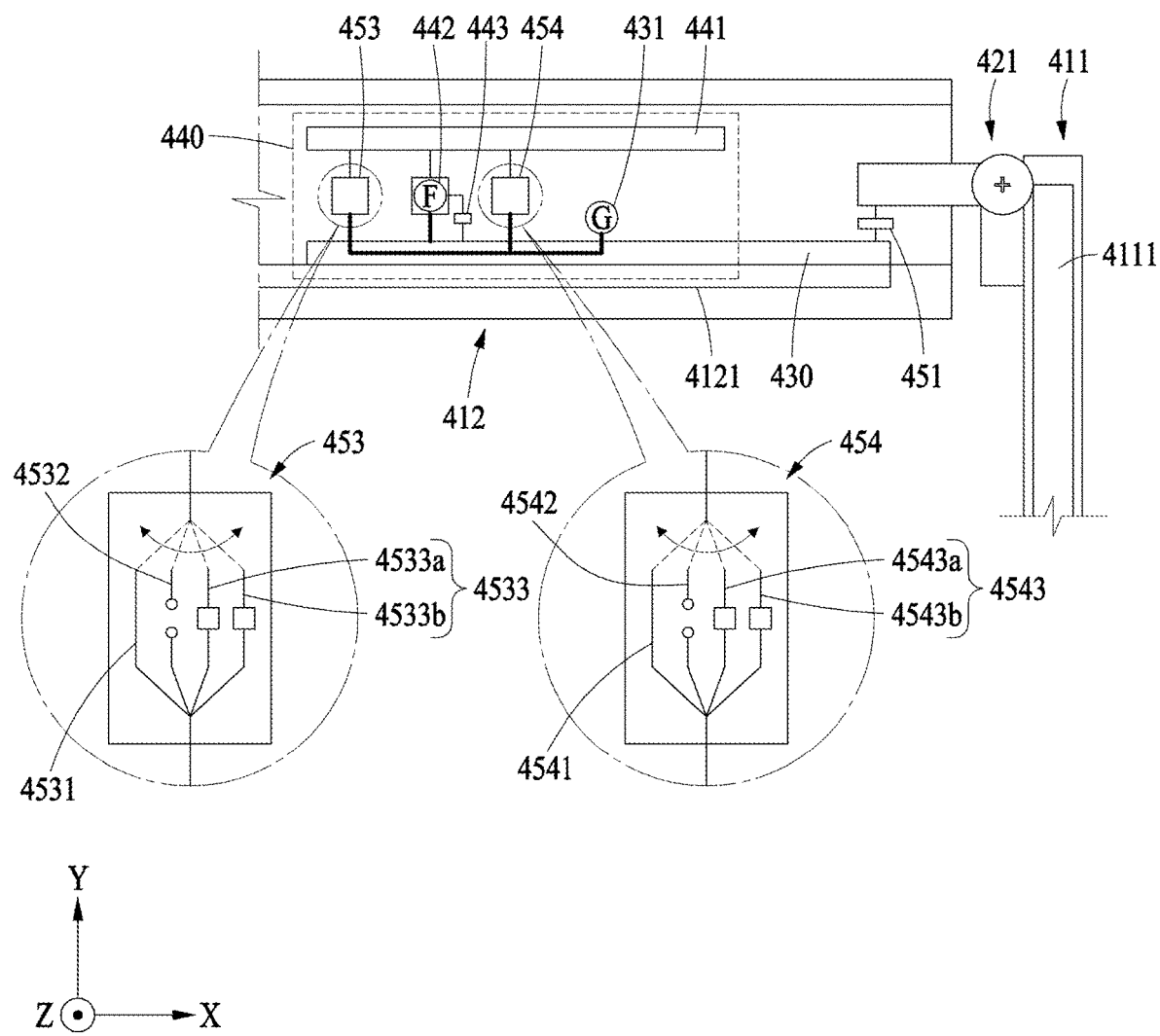
FIG. 4B is a plan view schematically illustrating an antenna structure included in a wearable electronic device according to an embodiment.
Figure 4C:
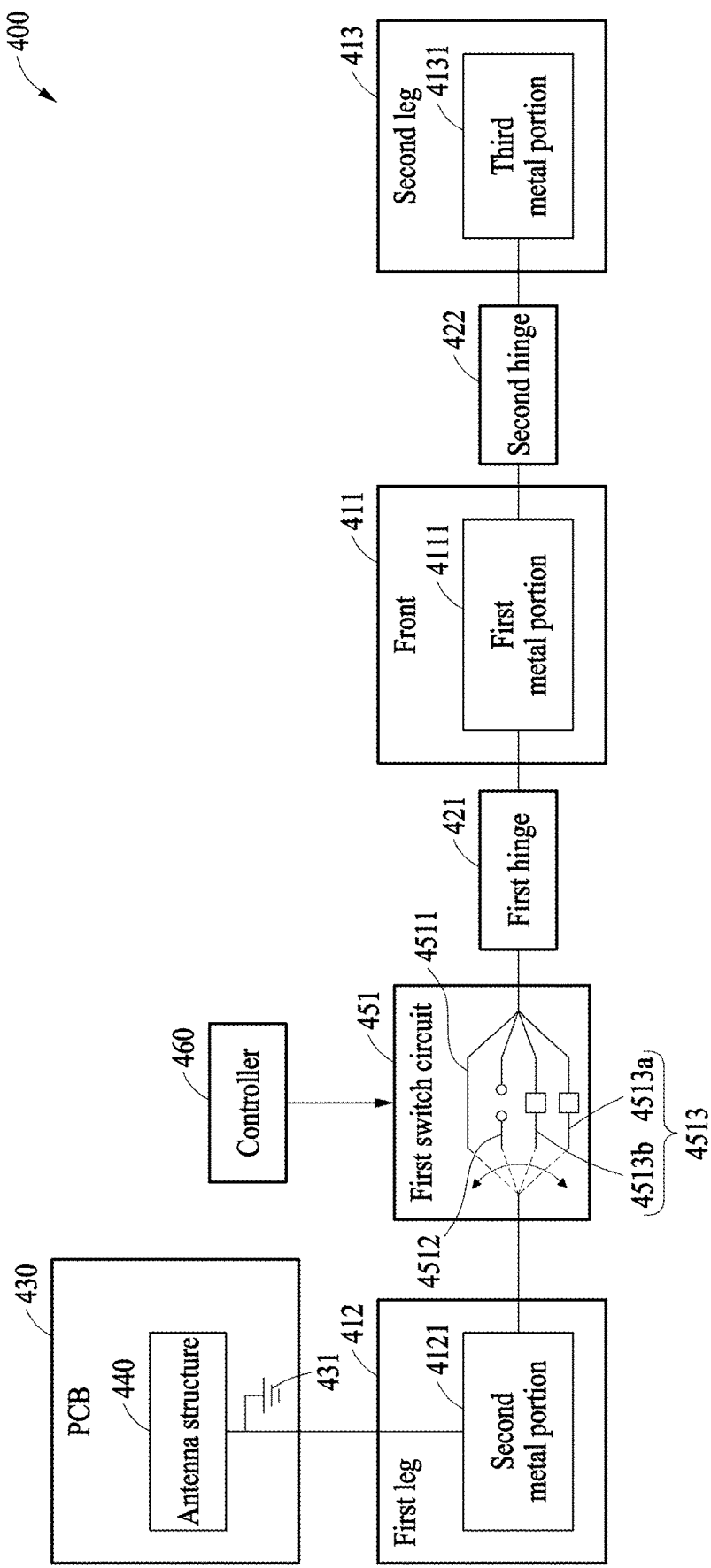
FIG. 4C is a block diagram illustrating a connection relationship between components of a wearable electronic device according to an embodiment.
Figure 4D:
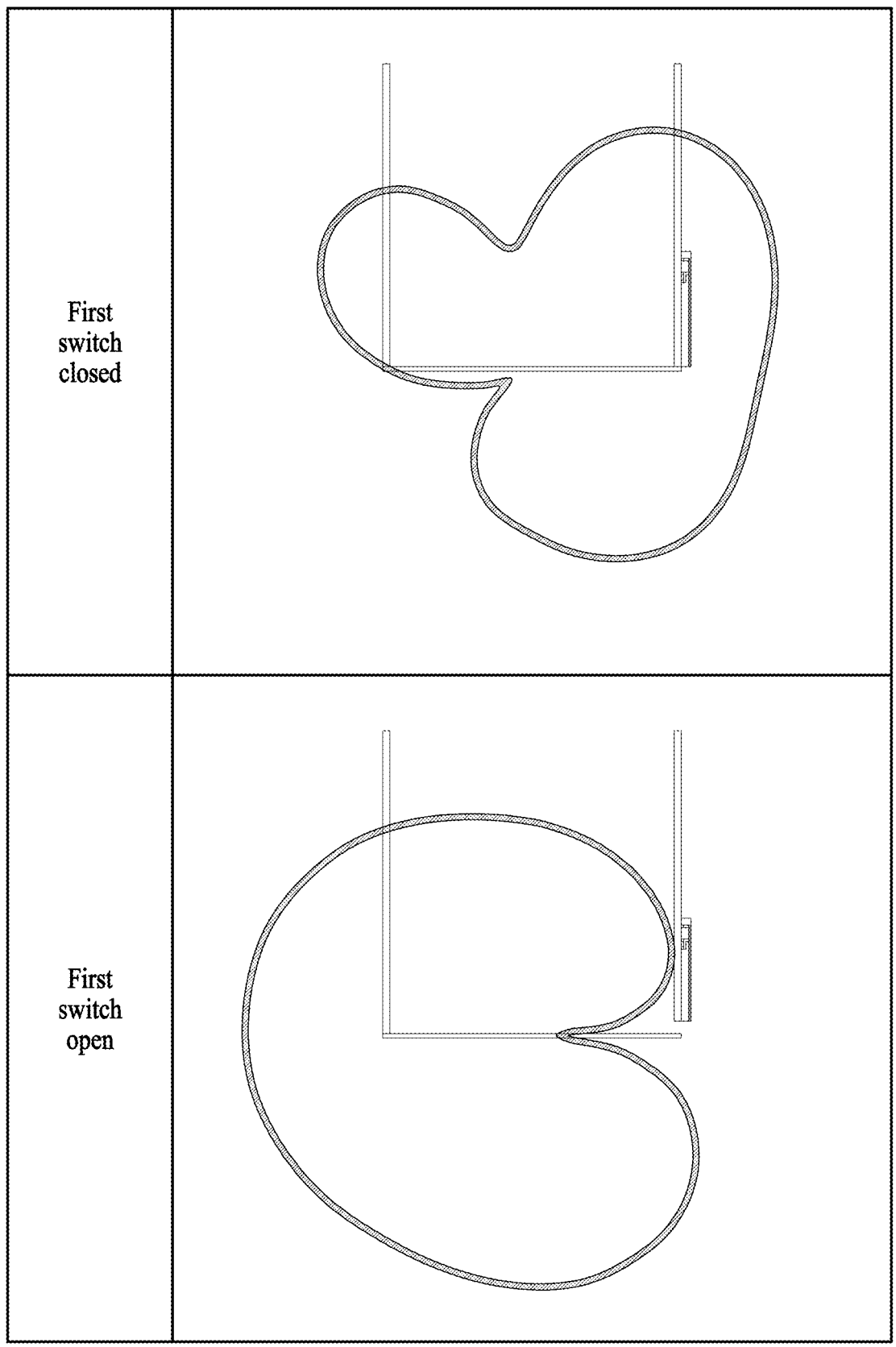
FIG. 4D is simulation data illustrating radiation patterns of a signal radiated according to a state of a first switch circuit in an unfolded state of a wearable electronic device according to an embodiment.

With continued reference to the drawings, FIG. 4A is a perspective view schematically illustrating a wearable electronic device according to an embodiment. FIG. 4B is a plan view schematically illustrating an antenna structure included in a wearable electronic device according to an embodiment. FIG. 4C is a block diagram illustrating a connection relationship between components of a wearable electronic device according to an embodiment. FIG. 4D is simulation data illustrating radiation patterns of a signal radiated according to a state of a first switch circuit in an unfolded state of a wearable electronic device according to an embodiment.

Referring to FIG. 4A to 4D, a wearable electronic device 400 (e.g., the wearable electronic device 200 of FIG. 2) according to an embodiment may be worn on the body (e.g., the head) of a user. For example, the wearable electronic device 400 may substantially include a shape of glasses.

The wearable electronic device 400 may include a frame 410, lenses 414, a first hinge 421, a second hinge 422, a PCB 430, an antenna structure 440, a first switch circuit 451 and/or a controller 460.

In one embodiment, the frame 410 may form an exterior of the electronic device 400. The frame 410 may provide a space in which various components of the wearable electronic device 400 are disposed. For example, the frame 410 may include a front 411, a first leg 412, and a second leg 413.

In one embodiment, the front 411 may form an exterior of a front surface (e.g., a surface in a +x direction) of the wearable electronic device 400. The lenses 414 (e.g., the first transparent member 225a and/or the second transparent member 225b of FIG. 2) may be disposed on the front 411. For example, the front 411 may include rims (e.g., the rims 272a and 272b of FIG. 2) in which the lenses 414 are disposed, and a bridge (e.g., the bridge 273 of FIG. 2) connecting the pair of rims 272a and 272b. The front 411 may include a first metal portion 4111. For example, at least a portion of the front 411 may be formed of metal. For example, the front 411 itself may be formed of metal, or the front 411 may be formed by injection and a metal structure may be disposed therein. For example, the first metal portion 4111 may include at least one metal portion of the front 411, a ground layer of a PCB (e.g., an FPCB) (not shown) disposed on the front 411, and/or a metal structure (e.g., a SUS structure) disposed on the front 411. However, the first metal portion 4111 is not limited thereto, and the first metal portion 4111 may be any metal portion disposed inside and/or outside the front 411.

In one embodiment, the first leg 412 (e.g., the temple 271a of FIG. 2) and the second leg 413 (e.g., the temple 271b of FIG. 2) may form leg portions of the wearable electronic device 400. In one embodiment, various components may be disposed inside and/or outside the first leg 412 and/or the second leg 413.

In one embodiment, the first leg 412 may include a second metal portion 4121. For example, at least a portion of the first leg 412 may be formed of metal. For example, the first leg 412 itself may be formed of metal, or the first leg 412 may be formed by injection and a metal structure may be disposed therein. For example, the second metal portion 4121 may include at least one metal portion of the first leg 412, a ground layer (e.g., a ground portion 431) of the PCB 430 disposed on the first leg 412, and/or a metal structure (e.g., a SUS structure) disposed on the first leg 412. However, the second metal portion 4121 is not limited thereto, and the second metal portion 4121 may be any metal portion disposed inside and/or outside the first leg 412.

In one embodiment, the second leg 413 may include a third metal portion 4131. For example, at least a portion of the second leg 413 may be formed of metal. For example, the second leg 413 itself may be formed of metal, or the second leg 413 may be formed by injection and a metal structure may be disposed therein. For example, the third metal portion 4131 may include at least one metal portion of the second leg 413, a ground layer of a PCB (e.g., an FPCB) (not shown) disposed on the second leg 413, and/or a metal structure (e.g., a SUS structure) disposed on the second leg 413. However, the third metal portion 4131 is not limited thereto, and the third metal portion 4131 may be any metal portion disposed inside and/or outside the second leg 413.

In one embodiment, the first leg 412 may be connected to one end (e.g., an end in a +y direction) of the front 411 through the first hinge 421 (e.g., the first hinge 240a of FIG. 2). The first leg 412 may be folded or unfolded relative to the front 411 through the first hinge 421. The second leg 413 may be connected to the other end (e.g., an end in a −y direction) of the front 411 through the second hinge 422 (e.g., the second hinge 240b of FIG. 2). The second leg 413 may be folded or unfolded relative to the front 411 through the second hinge 422. The first hinge 421 and/or the second hinge 422 may be at least partially formed of metal. The first hinge 421 may electrically connect the first metal portion 4111 and the second metal portion 4121. For example, the first hinge 421 may be electrically connected to the first metal portion 4111 and the second metal portion 4121 through a connecting member (e.g., a C-Clip). The second hinge 422 may electrically connect the first metal portion 4111 and the third metal portion 4131. For example, the second hinge 422 may be electrically connected to the first metal portion 4111 and the third metal portion 4131 through a connecting member (e.g., a C-Clip). Meanwhile, the state of the electrical connection between the first metal portion 4111 and the second metal portion 4121 may be changed by a first switch circuit (e.g., the first switch circuit 451 of FIG. 4C), which will be described later, and the electrical connection between the first metal portion 4111 and the third metal portion 4131 may be changed by a second switch circuit (e.g., a second switch circuit 452 of FIG. 4E), which will be described later. The first metal portion 4111, the second metal portion 4121, and/or the third metal portion 4131 may substantially function as a ground of the antenna structure 440 according to a state of the electrical connection therebetween. A detailed description thereof will be provided later.

In one embodiment, the PCB 430 (e.g., the first substrate 235a and/or the second substrate 235b of FIG. 2) may be disposed inside the frame 410. For example, the PCB 430 may be disposed inside the first leg 412 and/or the second leg 413. However, this is merely an example, and the PCB 430 may be disposed on the front 411 as shown in FIGS. 5A to 5F. The PCB 430 may include the ground portion 431. For example, the ground portion 431 may be a metal layer formed of a conductive member. The ground portion 431 may be electrically connected to the first metal portion 4111 and/or the second metal portion 4121. For example, the ground portion 431 may be connected to the first metal portion 4111 and/or the second metal portion 4121 through a connecting member (e.g., a C-Clip). For example, when the PCB 430 is disposed inside the first leg 412, the ground portion 431 may be electrically connected to the second metal portion 4121 of the first leg 412. However, this is merely an example, and the position of the PCB 430 and the metal portion to which the ground portion 431 is electrically connected are not limited thereto. A detailed description of the metal portion electrically connected to the ground portion 431 will be described later.

In one embodiment, the antenna structure 440 (e.g., the antenna module 197 of FIG. 1) may transmit and/or receive signals. At least a portion of the antenna structure 440 may be disposed on the PCB 430 or may be electrically connected to the PCB 430. For example, the antenna structure 440 may be integrally formed with the PCB 430 by being connected thereto, or may be formed as a separate component from the PCB 430 and connected to the PCB 430.

In one embodiment, the antenna structure 440 may include a radiating element 441, a feeder 442, and/or a matching circuit 443. The radiating element 441 may be an element for radiating a signal, and at least a portion thereof may be formed of a metal portion. The feeder 442 may be electrically connected to the radiating element 441 to transmit an electrical signal to the radiating element 441. For example, the feeder 442 may be electrically connected to the radiating element 441 through a connecting member (e.g., a C-Clip). The matching circuit 443 may be a circuit for impedance matching. The matching circuit 443 may correct an impedance difference between two connection terminals. However, this is merely an example, and the configuration of the antenna structure 440 is not limited thereto. For example, the antenna structure 440 may include a ground portion where the radiating element 441 is electrically connected to the ground portion 431 of the PCB 430. For example, the ground portion may be implemented by a third switch circuit 453 and/or a fourth switch circuit 454 which will be described later. Meanwhile, the shape of the radiating element 441 shown in FIG. 4B is merely an example, and the shape of the radiating element 441 is not limited thereto.

In one embodiment, the first switch circuit 451 may be positioned between the first metal portion 4111 of the front 411 and the second metal portion 4121 of the first leg 412. For example, the first switch circuit 451 may be positioned between the first hinge 421 and the second metal portion 4121. However, this is merely an example, and the first switch circuit 451 may also be positioned between the first hinge 421 and the first metal portion 4111. For example, the first switch circuit 451 may be connected to the first hinge 421 and/or the first metal portion 4111 through a connecting member (e.g., a C-Clip).

In one embodiment, the first switch circuit 451 may electrically connect or disconnect the first metal portion 4111 and the second metal portion 4121, or change an impedance for connecting the first metal portion 4111 and the second metal portion 4121. The first switch circuit 451 may include at least one path. For example, the first switch circuit 451 may include a closed path 4511, an open path 4512, and/or a lumped element path 4513. The lumped element path 4513 may be formed of any one or a combination of a resistive element, a capacitive element, and an inductive element. A single or a plurality of lumped element paths 4513 may be formed. A plurality of lumped element paths 4513a and 4513b may be set to have different impedances. However, this is merely an example, and the paths of the first switch circuit 451 are not limited thereto. Further, although FIG. 4C illustrates two lumped element paths 4513a and 4513b, this is merely an example, and the number of lumped element paths 4513 is not limited thereto.

In one embodiment, the controller 460 may control the first switch circuit 451. The controller 460 may select any one of the plurality of paths of the first switch circuit 451. The controller 460 may control the first switch circuit 451 to change the impedance and/or the electrical length of the metal portion connected to the ground portion 431. In one or more non-limiting embodiments, the length of the metal portion refers to a total amount of metal that is connected to the ground portion 431 based on a total number of the metal portions described herein that are connected to the ground portion 431. For example, when the open path 4512 is selected in the first switch circuit 451, the first metal portion 4111 and the second metal portion 4121 may be electrically disconnected from each other. In this case, the ground portion 431 may be electrically connected only to the second metal portion 4121. For example, when the closed path 4511 is selected in the first switch circuit 451, the first metal portion 4111 and the second metal portion 4121 may be electrically connected to each other. In this case, the ground portion 431 may be electrically connected to at least the second metal portion 4121 and the first metal portion 4111. For example, in a case where the first metal portion 4111 is electrically connected to the third metal portion 4131 through the second hinge 422, the ground portion 431 may be electrically connected to all the second metal portion 4121, the first metal portion 4111, and the third metal portion 4131 when the closed path 4511 is selected in the first switch circuit 451. As the length of the metal portion connected to the ground portion 431 changes, the length of the ground connected to the antenna structure 440 changes, such that the antenna structure 440 may change, for example, from a half-wavelength dipole antenna to a full-wavelength antenna. Accordingly, the controller 460 may control the first switch circuit 451 to change the length of the metal portion connected to the ground portion 431, thereby changing a radiation pattern of a radiated signal. Meanwhile, the term "length of the ground" is for ease of description and is not limited to the two-dimensional length of the ground, and the length of the ground may be substantially construed as the size or range of the ground. Likewise, the term "length of the metal portion" is also for ease of description and is not limited to the two-dimensional length of the metal portion, and the length of the metal portion may be substantially construed as the size or range of the metal portion.

For example, referring to FIG. 4D, it may be learned that a radiation pattern when the first switch circuit 451 is connected through the closed path 4511 differs from a radiation pattern when the first switch circuit 451 is connected through the open path 4512. Accordingly, it is possible to implement a variable radiation pattern through a variable ground by the control of the first switch circuit 451, thereby improving adaptability in various use environments and improving communication quality. Meanwhile, although FIG. 4D illustrates only simulation data about opening and closing the first switch circuit 451, this is merely an example, and the radiation pattern may be changed by varying the impedance between the first metal portion 4111 and/or the second metal portion 4121 through the first switch circuit 451.

In the description of the wearable electronic device 400 with reference to FIGS. 4A to 4D, it is described and illustrated that the antenna structure 440 is positioned on the first leg 412. However, this is merely an example, and the position of the antenna structure 440 is not limited thereto. For example, the antenna structure 440 may be positioned on the second leg 413 and/or the front 411. For example, a case where the antenna structure 440 is positioned on the second leg 413 may be construed as an embodiment which is substantially symmetrical to the embodiment described with reference to FIGS. 4A to 4D. For example, when the antenna structure 440 is positioned on the front 411, the first metal portion 4111 may be connected to or disconnected from the second metal portion 4121 according to the control of the first switch circuit 451, and the impedance between the first metal portion 4111 and the second metal portion 4121 may vary.

Figure 4E:
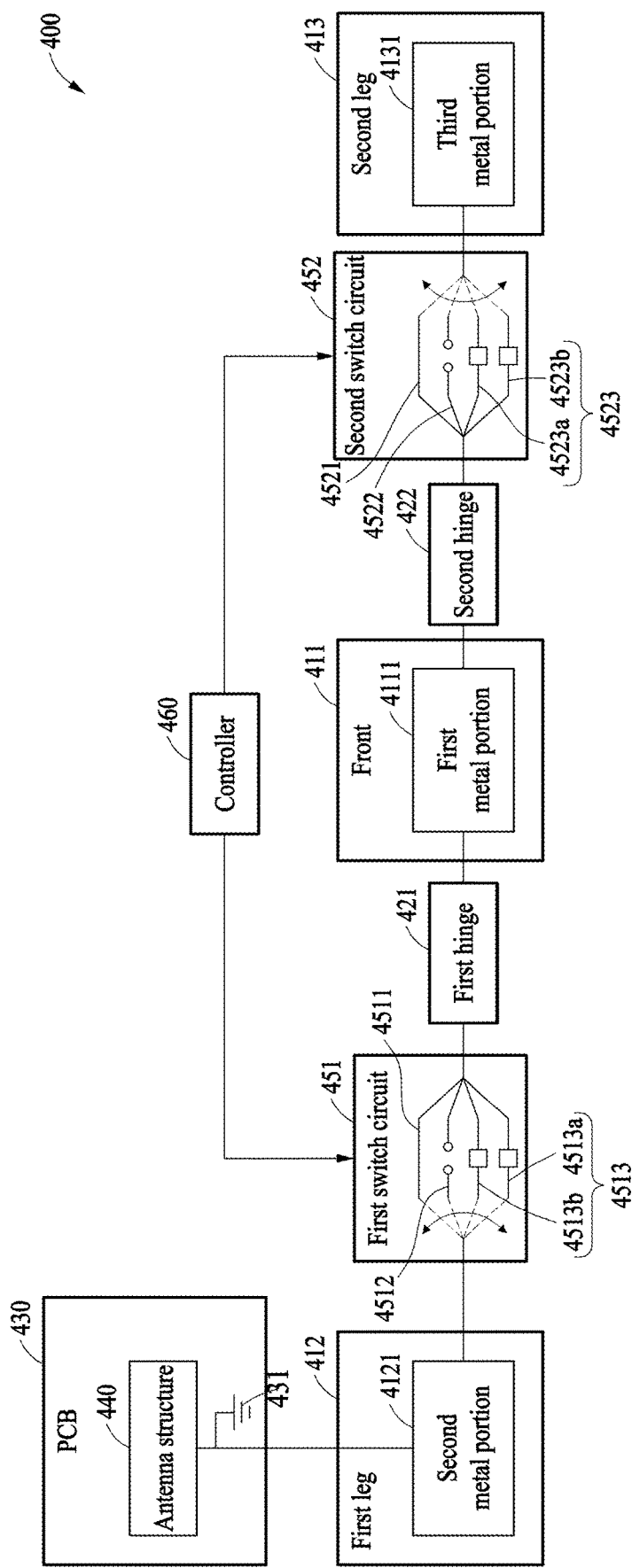
FIG. 4E is a block diagram illustrating a connection relationship between components of a wearable electronic device according to an embodiment.

FIG. 4E is a block diagram illustrating a connection relationship between components of a wearable electronic device according to an embodiment. FIG. 4F is simulation data illustrating radiation patterns of a signal radiated according to states of a first switch circuit (e.g., the first switch circuit 451 of FIG. 4C) and a second switch circuit (e.g., the second switch circuit 452 of FIG. 4E) in an unfolded state of a wearable electronic device according to an embodiment.

Referring to FIG. 4E, the wearable electronic device 400 according to an embodiment may further include the second switch circuit 452.

In one embodiment, the second switch circuit 452 may be positioned between the first metal portion 4111 of the front 411 and the third metal portion 4131 of the second leg 413. For example, the second switch circuit 452 may be positioned between the second hinge 422 and the third metal portion 4131. However, this is merely an example, and the second switch circuit 452 may be positioned between the second hinge 422 and the first metal portion 4111. For example, the second switch circuit 452 may be connected to the second hinge 422 and/or the first metal portion 4111 through a connecting member (e.g., a C-Clip).

In one embodiment, the second switch circuit 452 may electrically connect or disconnect the first metal portion 4111 and the third metal portion 4131, or change an impedance for connecting the first metal portion 4111 and the third metal portion 4131. The second switch circuit 452 may include at least one path. For example, the second switch circuit 452 may include a closed path 4521, an open path 4522, and/or a lumped element path 4523. The lumped element path 4523 may be formed of any one or a combination of a resistive element, a capacitive element, and an inductive element. A single or a plurality of lumped element paths 4523 may be formed. A plurality of lumped element paths 4523a and 4523b may be set to have different impedances. However, this is merely an example, and the paths of the second switch circuit 452 are not limited thereto. Further, although FIG. 4E illustrates two lumped element paths 4523a and 4523b, this is merely an example, and the number of lumped element paths 4523 is not limited thereto.

In one embodiment, the controller 460 may control the second switch circuit 452. The controller 460 may select any one of the plurality of paths of the second switch circuit 452.

In one embodiment, the controller 460 may control the first switch circuit 451 and/or the second switch circuit 452 to change the impedance and/or the length of the metal portion connected to the ground portion 431. For example, when both the first switch circuit 451 and the second switch circuit 452 are open, the first metal portion 4111 may be electrically disconnected from each of the second metal portion 4121 and the third metal portion 4131. In this case, the ground portion 431 may be electrically connected only to the second metal portion 4121, and the first metal portion 4111 and the third metal portion 4131 may be electrically disconnected. For example, when the first switch circuit 451 is closed and the second switch circuit 452 is open, the first metal portion 4111 may be electrically connected to the second metal portion 4121 and electrically disconnected from the third metal portion 4131. In this case, the ground portion 431 may be electrically connected to the second metal portion 4121 and the first metal portion 4111. For example, when the first switch circuit 451 is open and the second switch circuit 452 is closed, the first metal portion 4111 may be electrically disconnected from the second metal portion 4121 and electrically connected to the third metal portion 4131. In this case, the ground portion 431 may be electrically connected only to the second metal portion 4121, and the first metal portion 4111 and the third metal portion 4131 may be electrically connected. For example, when both the first switch circuit 451 and the second switch circuit 452 are closed, the first metal portion 4111 may be electrically connected to both the second metal portion 4121 and the third metal portion 4131. In this case, the ground portion 431 may be electrically connected to all the second metal portion 4121, the first metal portion 4111, and the third metal portion 4131. For example, referring to FIG. 4F, it can be learned that a different radiation pattern is formed according to states of the first switch circuit 451 and the second switch circuit 452. Accordingly, the controller 460 may control the first switch circuit 451 and/or the second switch circuit 452 to change the length of the metal portion connected to the ground portion 431, thereby changing a radiation pattern of a radiated signal. When the first switch circuit 451 and the second switch circuit 452 are included, the length of the metal portion connected to the ground portion 431 may be changed more minutely, and thus, it is possible to implement various radiation patterns. Meanwhile, although FIG. 4F illustrates only simulation data about opening and closing the first switch circuit 451 and the second switch circuit 452, this is merely an example, and the radiation pattern may be changed by varying the impedance between the first metal portion 4111 and/or the second metal portion 4121 and/or the impedance between the first metal portion 4111 and the third metal portion 4131 through the first switch circuit 451 and the second switch circuit 452.

Figure 4G:
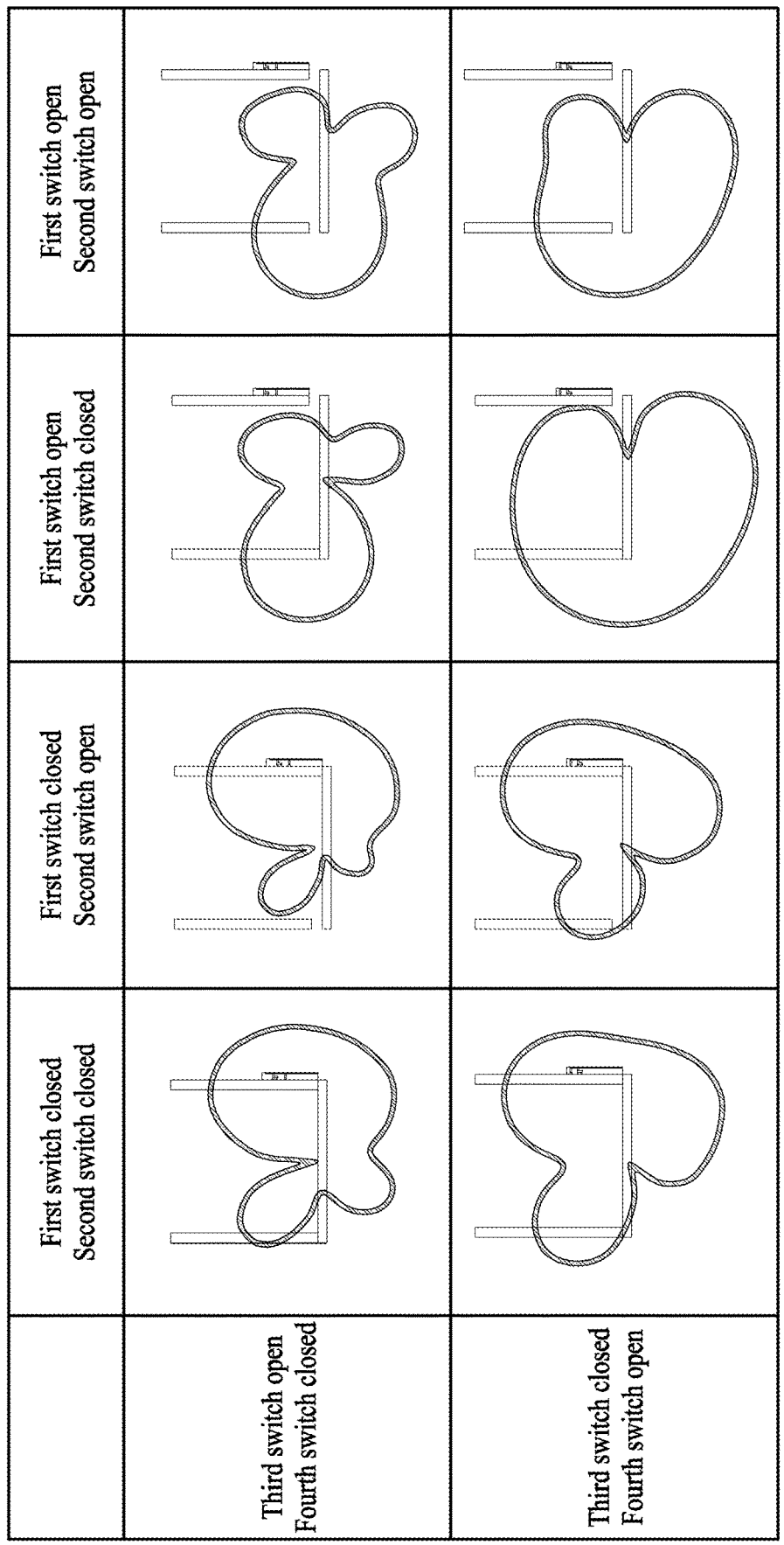
FIG. 4G is simulation data illustrating radiation patterns of a signal radiated according to states of a first switch circuit, a second switch circuit, a third switch circuit, and a fourth switch circuit in an unfolded state of a wearable electronic device according to an embodiment.

FIG. 4G is simulation data illustrating radiation patterns of a signal radiated according to states of a first switch circuit, a second switch circuit, a third switch circuit, and a fourth switch circuit in an unfolded state of a wearable electronic device according to an embodiment.

Referring to FIGS. 4B and 4G, the wearable electronic device 400 according to an embodiment may further include the third switch circuit 453 and/or the fourth switch circuit 454.

In one embodiment, the third switch circuit 453 and the fourth switch circuit 454 may connect the radiating element 441 and the ground portion 431 at positions adjacent to the feeder 442. For example, the third switch circuit 453 and the fourth switch circuit 454 may be positioned on both sides of the feeder 442, such that the feeder 442 may be positioned between the third switch circuit 453 and the fourth switch circuit 454. As another example, if both the third switch circuit 453 and the fourth switch circuit 454 can be positioned on one side of the feeder 442, other embodiments may be possible. For example, the third switch circuit 453 and/or the fourth switch circuit 454 may be connected to the radiating element 441 and/or the ground portion 431 through a connecting member (e.g., a C-Clip).

In one embodiment, the third switch circuit 453 and the fourth switch circuit 454 may each electrically connect or disconnect the radiating element 441 and the ground portion 431, or change an impedance for connecting the radiating element 441 and the ground portion 431. The third switch circuit 453 and the fourth switch circuit 454 may each include at least one path. For example, the third switch circuit 453 may include a closed path 4531, an open path 4532, and/or a lumped element path 4533. The lumped element path 4533 may be formed of any one or a combination of a resistive element, a capacitive element, and an inductive element. A single or a plurality of lumped element paths 4533 may be formed. A plurality of lumped element paths 4533a and 4533b may be set to have different impedances. For example, the fourth switch circuit 454 may include a closed path 4541, an open path 4542, and/or a lumped element path 4543. The lumped element path 4543 may be formed of any one or a combination of a resistive element, a capacitive element, and an inductive element. A single or a plurality of lumped element paths 4543 may be formed. A plurality of lumped element paths 4543a and 4543b may be set to have different impedances. However, this is merely an example, and the paths of the third switch circuit 453 and/or the fourth switch circuit 454 are not limited thereto. Further, although FIG. 4B illustrates two lumped element paths 4533a and 4533b, 4543a and 4543b, this is merely an example, and the number of lumped element paths 4533, 4543 is not limited thereto.

In one embodiment, the controller (e.g., the controller 460 of FIG. 4C) may control the third switch circuit 453 and/or the fourth switch circuit 454. The controller 460 may select any one of the plurality of paths of the third switch circuit 453 and/or the fourth switch circuit 454. For example, the controller 460 may control the third switch circuit 453 and/or the fourth switch circuit 454 to adjust a band of a signal radiated from the radiating element 441 and/or a radiation pattern of the radiated signal. For example, the controller 460 may open the third switch circuit 453 and close the fourth switch circuit 454, or close the third switch circuit 453 and open the fourth switch circuit 454. However, this is merely an example, and the connection state of the third switch circuit 453 and/or the fourth switch circuit 454 is not limited thereto.

In one embodiment, the controller 460 may control at least one of the first switch circuit 451, the second switch circuit 452, the third switch circuit 453, or the fourth switch circuit 454 to adjust the pattern of the radiated signal. For example, as shown in FIG. 4G, by changing the states of the first switch circuit 451, the second switch circuit 452, the third switch circuit 453, and the fourth switch circuit 454, it is possible to change the radiation pattern of the radiated signal. The combination of the states of the first switch circuit 451, the second switch circuit 452, the third switch circuit 453, and the fourth switch circuit 454 shown in FIG. 4G is merely an example, and embodiments are not limited thereto and may include all possible combinations.

Figure 4H:
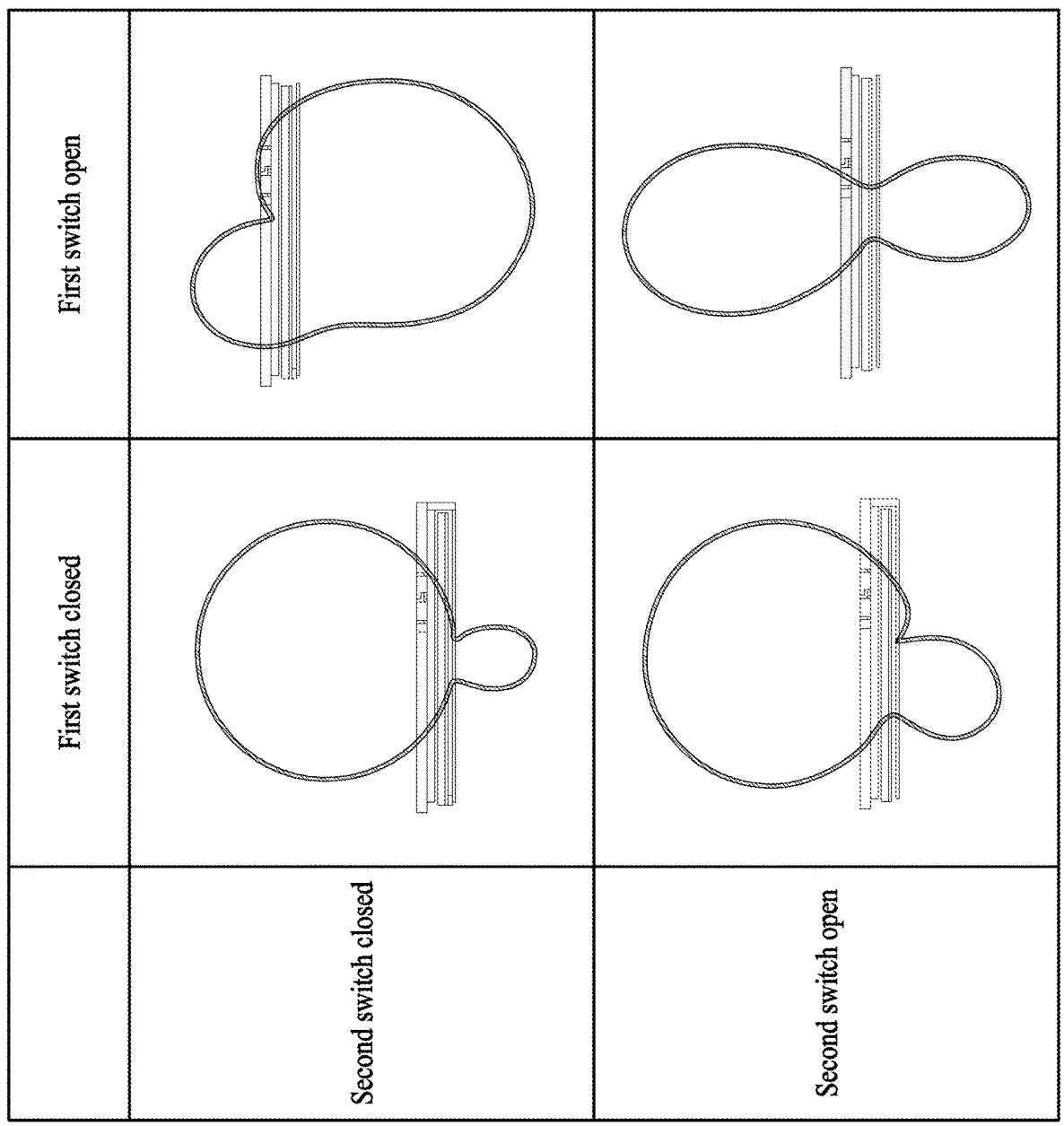
FIG. 4H is simulation data illustrating radiation patterns of a signal radiated according to states of a first switch circuit and a second switch circuit in a folded state of a wearable electronic device according to an embodiment.

FIG. 4H is simulation data illustrating radiation patterns of a signal radiated according to states of a first switch circuit and a second switch circuit in a folded state of a wearable electronic device according to an embodiment.

Referring to FIG. 4H, even when a wearable electronic device (e.g., the wearable electronic device 400 of FIG. 4A) is folded, a first switch circuit (e.g., the first switch circuit 451 of FIG. 4E), a second switch circuit (e.g., the second switch circuit 452 of FIG. 4E), a third switch circuit (e.g., the third switch circuit 453 of FIG. 4B), and/or a fourth switch circuit (e.g., the fourth switch circuit 454 of FIG. 4B) may operate. For example, even when the wearable electronic device 400 is folded, a radiation pattern of a radiated signal may be changed through the control of the first switch circuit 451 and the second switch circuit 452. However, FIG. 4H is merely an example, and even when the wearable electronic device 400 is folded, the radiation pattern of the radiated signal may be changed through various combinations of the states of the first switch circuit 451, the second switch circuit 452, the third switch circuit 453, and/or the fourth switch circuit 454.

Figure 5A:
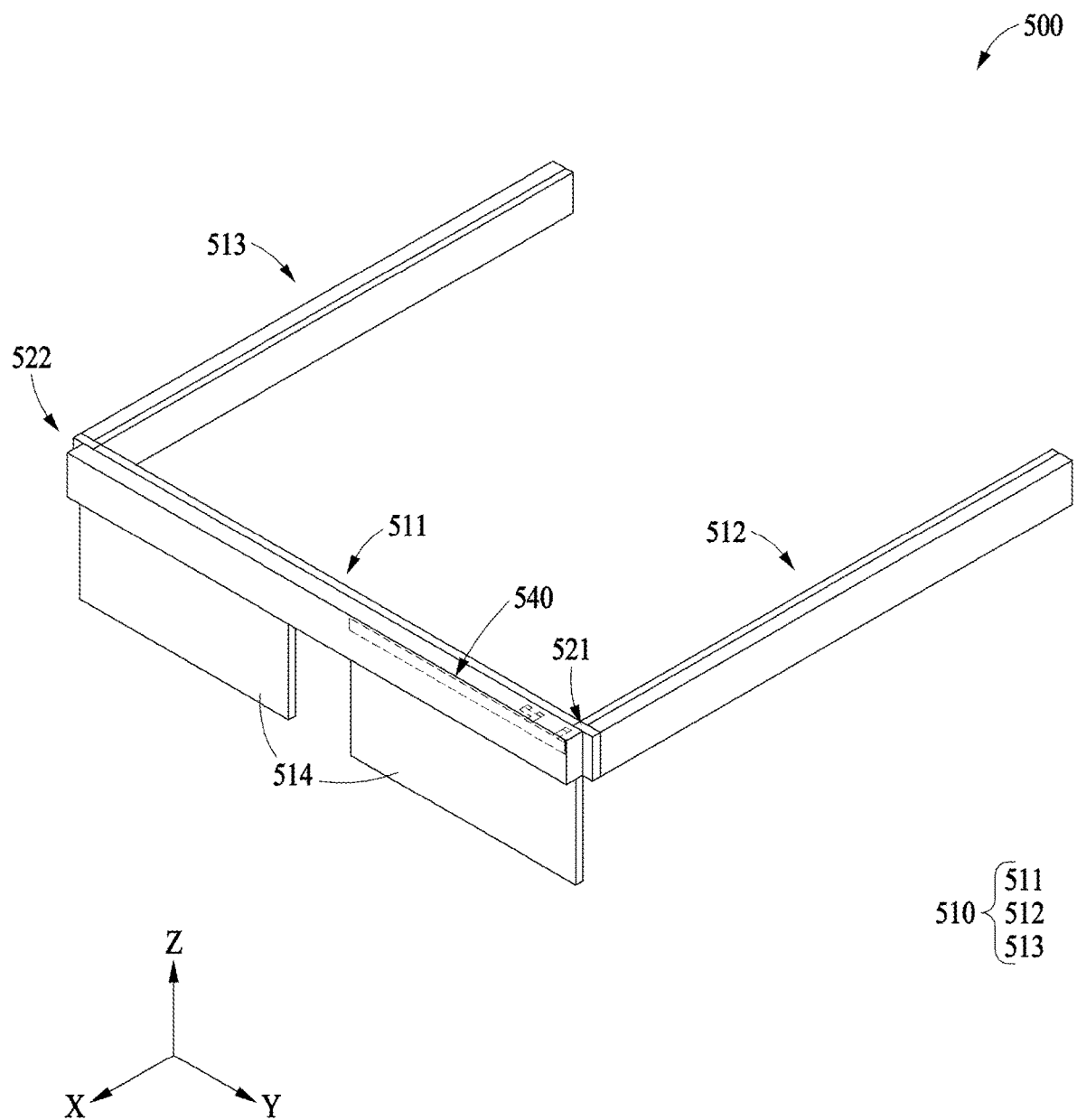
FIG. 5A is a perspective view schematically illustrating a wearable electronic device according to an embodiment.
Figure 5B:
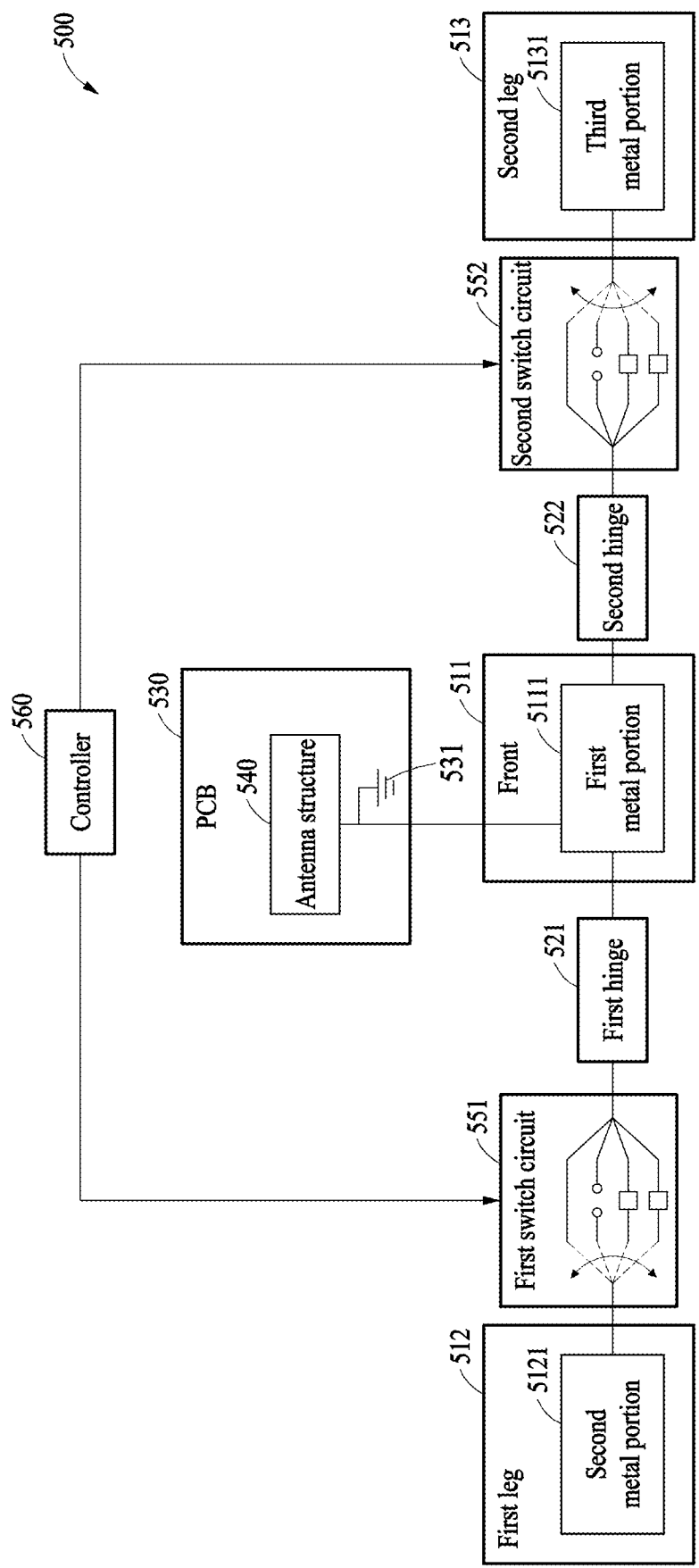
FIG. 5B is a block diagram illustrating a connection relationship between components of a wearable electronic device according to an embodiment.
Figure 5C:
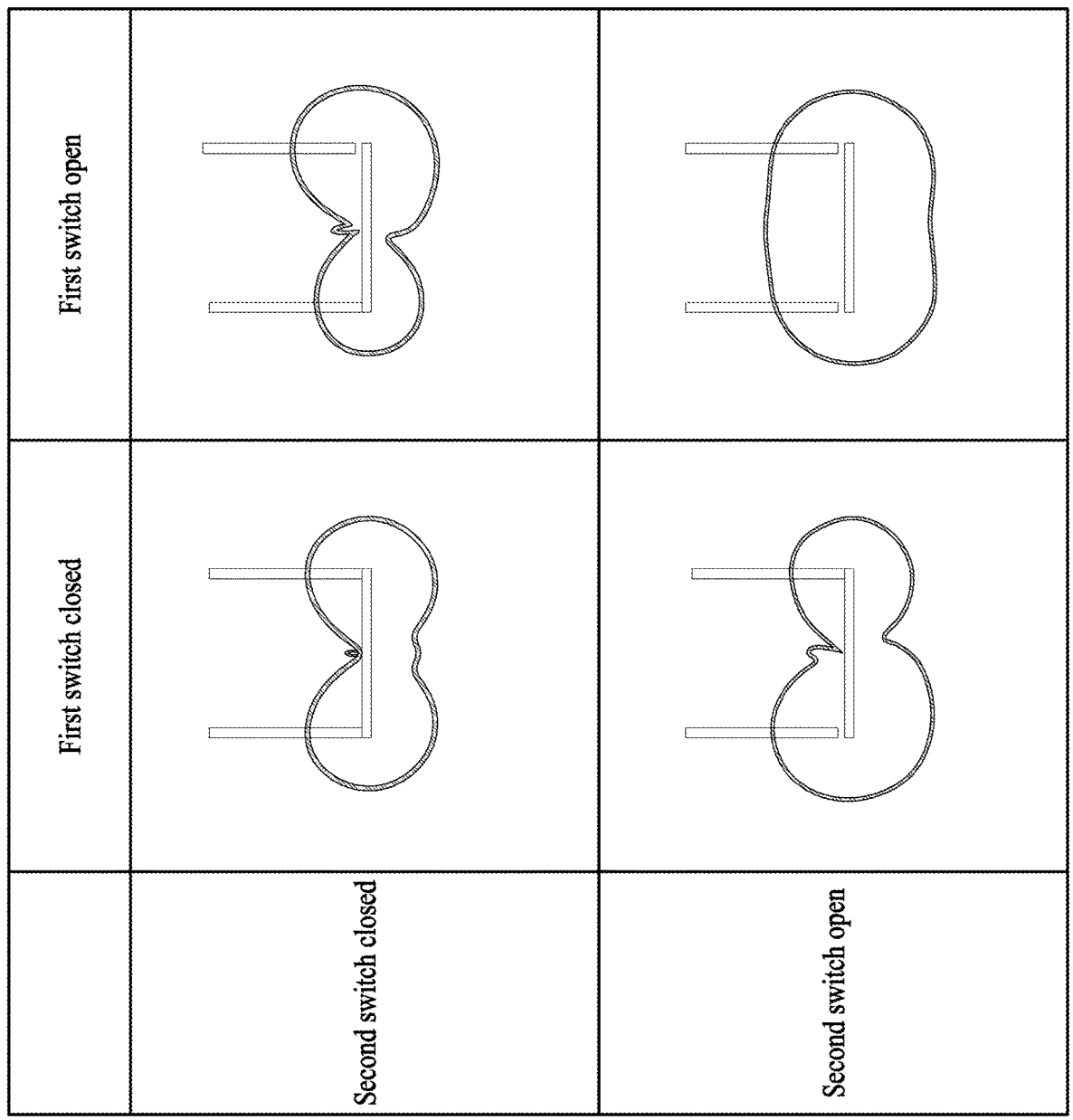
FIG. 5C is simulation data illustrating radiation patterns of a signal radiated according to states of a first switch circuit and a second switch circuit in an unfolded state of a wearable electronic device according to an embodiment.

FIG. 5A is a perspective view schematically illustrating a wearable electronic device according to an embodiment. FIG. 5B is a block diagram illustrating a connection relationship between components of a wearable electronic device according to an embodiment. FIG. 5C is simulation data illustrating radiation patterns of a signal radiated according to states of a first switch circuit and a second switch circuit in an unfolded state of a wearable electronic device according to an embodiment.

Referring to FIGS. 5A and 5B, a wearable electronic device 500 (e.g., the wearable electronic device 200 of FIG. 2) according to an embodiment may include a frame 510 (e.g., the frame 410 of FIG. 4A), lenses 514 (e.g., the lenses 414 of FIG. 4A), a first hinge 521 (e.g., the first hinge 421 of FIG. 4A), a second hinge 522 (e.g., the second hinge 422 of FIG. 4A), a PCB 530 (e.g., the PCB 430 of FIG. 4B), an antenna structure 540 (e.g., the antenna structure 440 of FIG. 4A), a first switch circuit 551 (e.g., the first switch circuit 451 of FIG. 4C), a second switch circuit 552 (e.g., the second switch circuit 452 of FIG. 4C), and/or a controller 560 (e.g., the controller 460 of FIG. 4C).

In one embodiment, the PCB 530 and the antenna structure 540 may be positioned inside a front 511 (e.g., the front 411 of FIG. 4A) of the frame 510. For example, the PCB 530 and the antenna structure 540 may be positioned on one side (e.g., a side in a +y direction) of the front 511. For example, the PCB 530 and the antenna structure 540 may be positioned closer to a first leg 512 (e.g., the first leg 412 of FIG. 4A) than to a second leg 513 (e.g., the second leg 413 of FIG. 4A). However, this is merely an example, and the positions of the PCB 530 and the antenna structure 540 are not limited thereto.

In one embodiment, the first switch circuit 551 may be positioned between a first metal portion 5111 (e.g., the first metal portion 4111 of FIG. 4C) of the front 511 and a second metal portion 5121 (e.g., the second metal portion 4121 of FIG. 4C) of the first leg 512. For example, the first switch circuit 551 may be positioned between the first hinge 521 and the second metal portion 5121.

In one embodiment, the second switch circuit 552 may be positioned between the first metal portion 5111 (e.g., the first metal portion 4111 of FIG. 4C) of the front 511 and a third metal portion 5131 (e.g., the third metal portion 4131 of FIG. 4C) of the second leg 513. For example, the second switch circuit 552 may be positioned between the second hinge 522 and the third metal portion 5131.

In one embodiment, the controller 560 may control the first switch circuit 551 and/or the second switch circuit 552 to change the impedance and/or the length of the metal portion connected to a ground portion 531 (e.g., the ground portion 431 of FIG. 4C). For example, when both the first switch circuit 551 and the second switch circuit 552 are open, the ground portion 531 may be electrically connected only to the first metal portion 5111 and electrically disconnected from the second metal portion 5121 and the third metal portion 5131. For example, when the first switch circuit 551 is closed and the second switch circuit 552 is open, the ground portion 531 may be electrically connected to the first metal portion 5111 and the second metal portion 5121 and electrically disconnected from the third metal portion 5131. For example, when the first switch circuit 551 is open and the second switch circuit 552 is closed, the ground portion 531 may be electrically connected to the first metal portion 5111 and the third metal portion 5131 and electrically disconnected from the second metal portion 5121. For example, when both the first switch circuit 551 and the second switch circuit 552 are closed, the ground portion 531 may be electrically connected to all the first metal portion 5111, the second metal portion 5121, and the third metal portion 5131.

In one embodiment, referring to FIG. 5C, it can be learned that a different radiation pattern is formed according to states of the first switch circuit 551 and the second switch circuit 552. Accordingly, the controller 560 may control the first switch circuit 551 and/or the second switch circuit 552 to change the length of the metal portion connected to the ground portion 531, thereby changing a radiation pattern of a radiated signal. As shown in FIGS. 5A and 5B, when the PCB 530 and the antenna structure 540 are positioned on the front 511, the length of the metal portion connected to the ground portion 531 may be changed in various ways using the first switch circuit 551 and the second switch circuit 552, and thus, it is possible to implement various radiation patterns. For example, when the PCB 530 and the antenna structure 540 are positioned closer to the first leg 512 than to the second leg 513, different radiation patterns may be generated in a state in which the first switch circuit 551 is open and the second switch circuit 552 is closed and in a state in which the second switch circuit 552 is open and the first switch circuit 551 is closed. Meanwhile, although FIG. 5C illustrates only simulation data about opening and closing the first switch circuit 551 and the second switch circuit 552, this is merely an example, and the radiation pattern may be changed by varying the impedance between the first metal portion 5111 and/or the second metal portion 5121 and/or the impedance between the first metal portion 5111 and the third metal portion 5131 through the first switch circuit 551 and the second switch circuit 552.

Figure 5D:
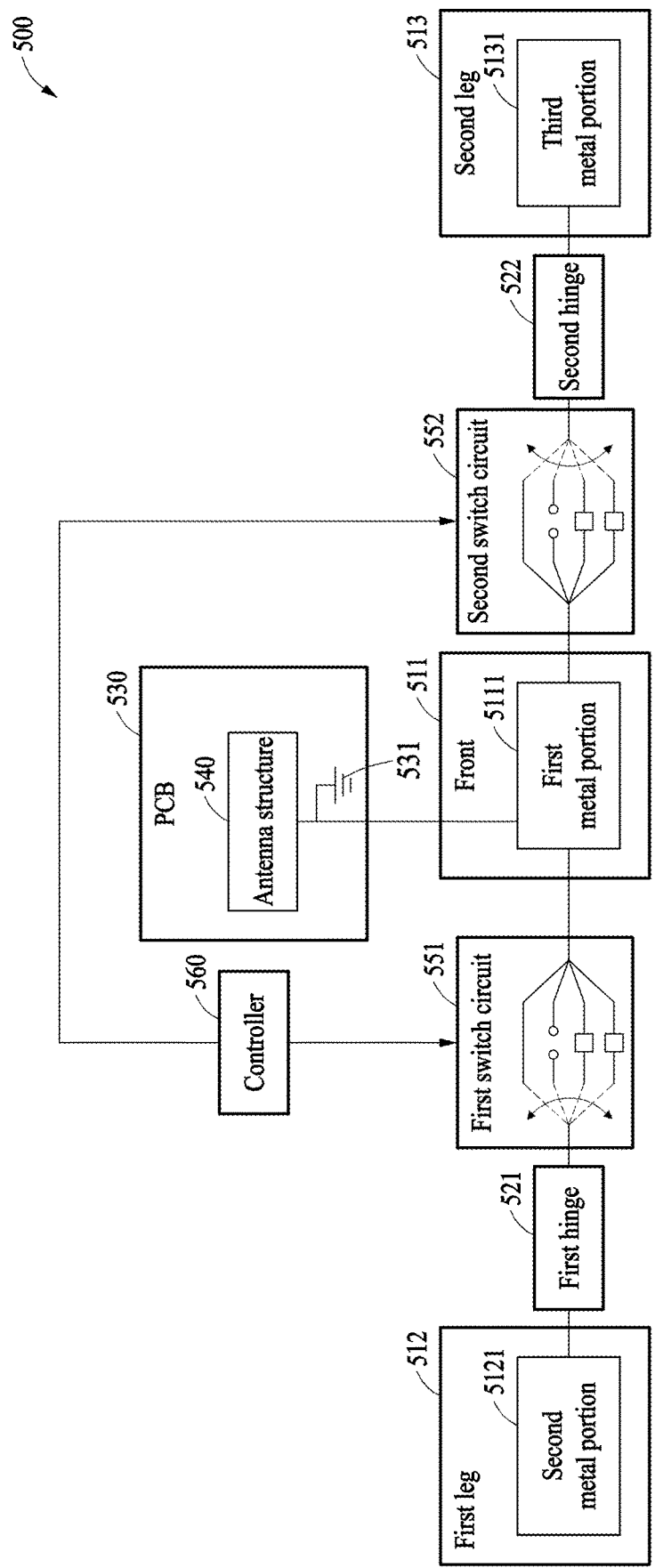
FIG. 5D is a block diagram illustrating a connection relationship between components of a wearable electronic device according to an embodiment.

FIG. 5D is a block diagram illustrating a connection relationship between components of a wearable electronic device according to an embodiment.

Referring to FIG. 5D, in one embodiment, the first switch 551 may be positioned between the first hinge 521 and the first metal portion 5111. The second switch 552 may be positioned between the second hinge 522 and the first metal portion 5111. Even with this positional relationship, the operation may substantially the same or similar to the description provided with reference to FIGS. 5A to 5C.

Figure 5E:
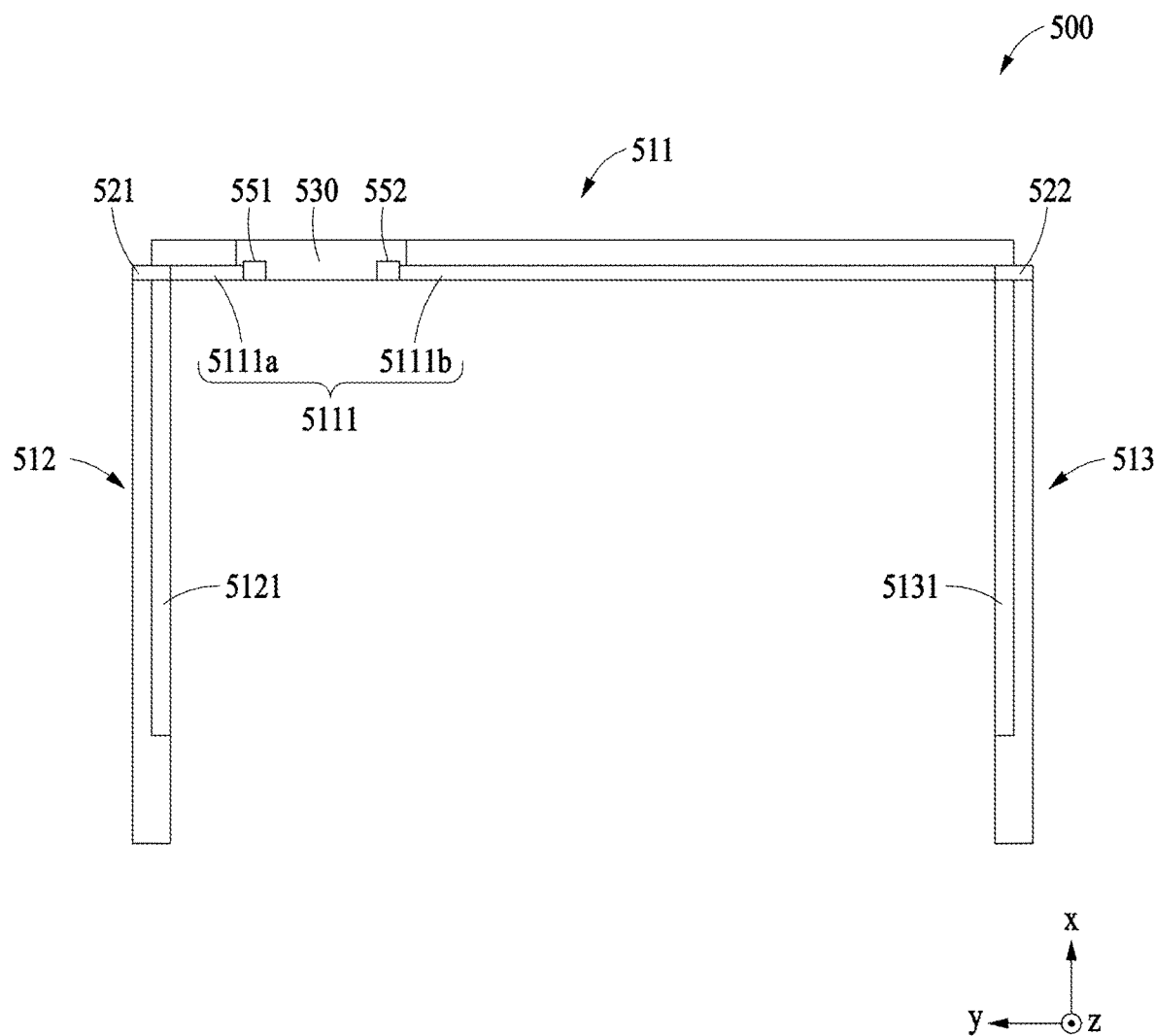
FIG. 5E is a plan view schematically illustrating a wearable electronic device according to an embodiment.
Figure 5F:
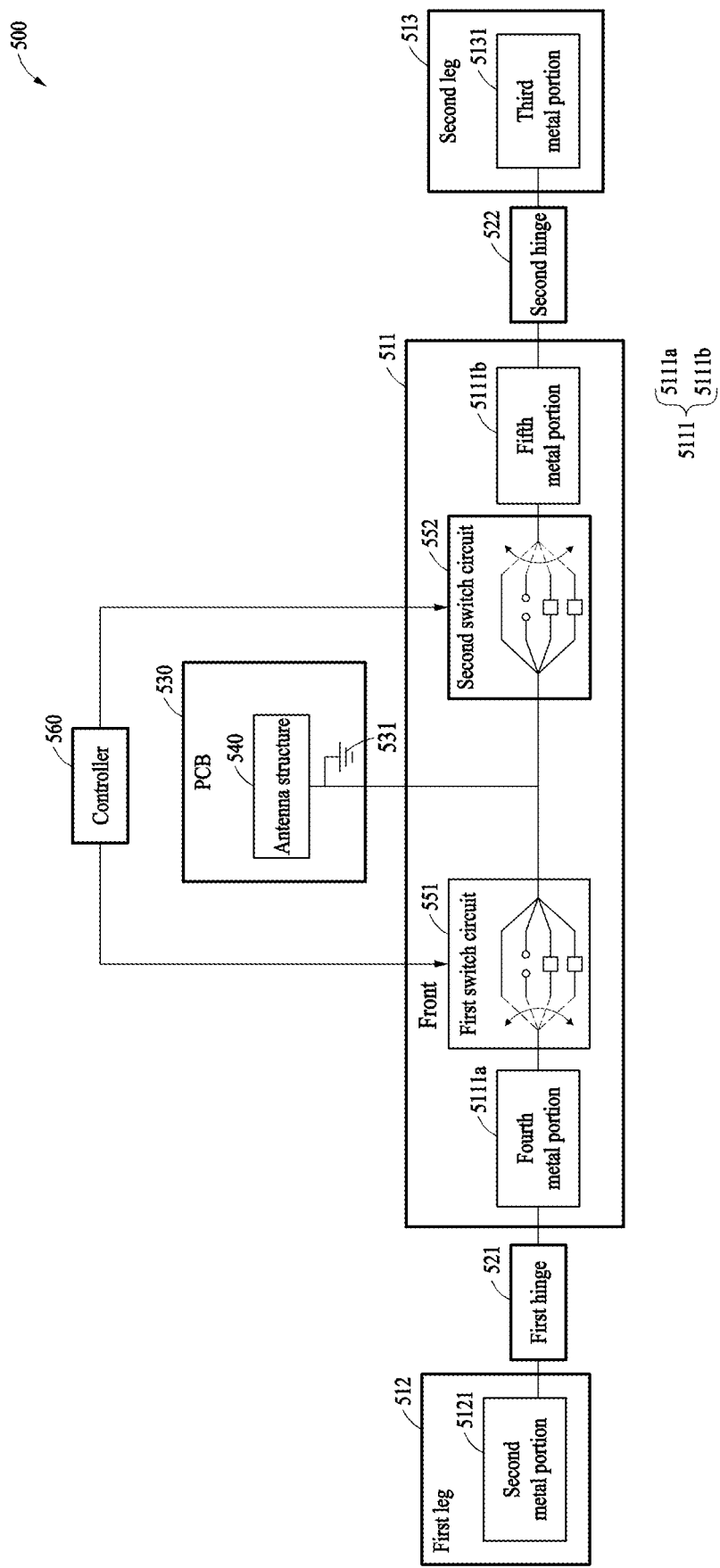
FIG. 5F is a block diagram schematically illustrating a connection relationship between components of a wearable electronic device according to an embodiment.

FIG. 5E is a plan view schematically illustrating a wearable electronic device according to an embodiment. FIG. 5F is a block diagram schematically illustrating a connection relationship between components of a wearable electronic device according to an embodiment.

Referring to FIGS. 5E and 5F, in one embodiment, the first metal portion 5111 may include a fourth metal portion 5111a and a fifth metal portion 5111b. The fourth metal portion 5111a may be electrically connected to the second metal portion 5121 through the first hinge 521. The fifth metal portion 5111b may be electrically connected to the third metal portion 5131 through the second hinge 522. When the PCB 530 and the antenna structure 540 are positioned closer to the first leg 512 than to the second leg 513, the fourth metal portion 5111a may be substantially formed to be shorter than the fifth metal portion 5111b.

In one embodiment, the first switch circuit 551 may connect the fourth metal portion 5111a and the ground portion 531 of the antenna structure 540. The second switch 552 may connect the fifth metal portion 5111b to the ground portion 531 of the antenna structure 540.

In one embodiment, the controller 560 may control the first switch circuit 551 and/or the second switch circuit 552 to change the impedance and/or the length of the metal portion connected to the ground portion 531. As described herein, the length of the metal portion may refer to a total amount of metal that is connected to the ground portion 531 based on a total number of the metal portions described herein that are connected to the ground portion 531. For example, when both the first switch circuit 551 and the second switch circuit 552 are open, the ground portion 531 may be electrically disconnected from all the fourth metal portion 5111a, the fifth metal portion 5111b, the second metal portion 5121, and the third metal portion 5131. For example, when the first switch circuit 551 is closed and the second switch circuit 552 is open, the ground portion 531 may be electrically connected to the fourth metal portion 5111a and the second metal portion 5121 and electrically disconnected from the fifth metal portion 5111b and the third metal portion 5131. For example, when the first switch circuit 551 is open and the second switch circuit 552 is closed, the ground portion 531 may be electrically connected to the fifth metal portion 5111b and the third metal portion 5131 and electrically disconnected from the fourth metal portion 5111a and the second metal portion 5121. For example, when both the first switch circuit 551 and the second switch circuit 552 are closed, the ground portion 531 may be electrically connected to all the fourth metal portion 5111a, the fifth metal portion 5111b, the second metal portion 5121, and the third metal portion 5131. As shown in FIG. 5E, when the fourth metal portion 5111a and the fifth metal portion 5111b are different in length, the length of the metal portion connected to the ground portion 531 may be changed in various ways using the first switch circuit 551 and the second switch circuit 552, and thus, it is possible to implement various radiation patterns.

In various embodiments, a wearable electronic device 400 may include: a frame including a front, a first leg, a second leg, and at least one metal portion; the front 411 with a lens 414 connected thereto, and including a first metal portion 4111 among the at least one metal portion; the first leg 412 connected to one end of the front 411 through a first hinge 421, and including a second metal portion 4121 among the at least one metal portion; the second leg 413 connected to an other end of the front 411 through a second hinge 422; a PCB 430 including a ground portion 431 electrically connected to the first metal portion 4111 or the second metal portion 4121; an antenna structure 440 including a radiating element 441 and a feeder 442 electrically connected to the radiating element 441; a first switch circuit 451 configured to electrically connect or disconnect the first metal portion 4111 and the second metal portion 4121 or to change an impedance for connecting the first metal portion 4111 and the second metal portion 4121; and a controller 460 configured to control the first switch circuit 451.

In various embodiments, the controller 460 may be configured to control the first switch circuit 451 to change a length of the at least one metal portion connected to the ground portion 431.

In various embodiments, the PCB 430 may be positioned inside the first leg 412, and the ground portion 431 may be electrically connected to the second metal portion 4121.

In various embodiments, the first metal portion 4111 and the second metal portion 4121 may be connected through the first hinge 421.

In various embodiments, the first switch circuit 451 may be positioned between the second metal portion 4121 and the first hinge 421.

In various embodiments, the second leg 413 may include a third metal portion 4131, and the wearable electronic device 400 may further include: a second switch circuit 452 configured to electrically connect or disconnect the first metal portion 4111 and the third metal portion 4131 or to change the impedance for connecting the first metal portion 4111 and the third metal portion 4131.

In various embodiments, the first metal portion 4111 and the third metal portion 4131 may be connected through the second hinge 422.

In various embodiments, the second switch circuit 452 may be positioned between the third metal portion 4131 and the second hinge 422.

In various embodiments, the controller 460 may be configured to control at least one of the first switch circuit 451 or the second switch circuit 452 to change a length of the at least one metal portion connected to the ground portion 431.

In various embodiments, the wearable electronic device 400 may further include: a third switch circuit 453 and a fourth switch circuit 454 connecting the radiating element 441 and the ground portion 431 at positions adjacent to the feeder 442.

In various embodiments, the feeder 442 may be positioned between the third switch circuit 453 and the fourth switch circuit 454.

In various embodiments, the third switch circuit 453 and the fourth switch circuit 454 may each be configured to electrically connect or disconnect the radiating element 441 and the ground portion 431 or to change an impedance for connecting the radiating element 441 and the ground portion 431.

In various embodiments, the controller 460 may be configured to control at least one of the third switch circuit 453 or the fourth switch circuit 454 to adjust at least one of a radiation pattern or a band of a radiated signal.

In various embodiments, the PCB 530 may be positioned inside the front 511, and the ground portion 531 may be electrically connected to the first metal portion 5111.

In various embodiments, the first switch circuit 451 may be operable in each of an unfolded state and a folded state of the first leg 412 and the second leg 413.

In various embodiments, a wearable electronic device 400 may include: a frame including a front, a first leg, a second leg, and at least one metal portion; the front 411 with a lens 414 connected thereto, and including a first metal portion 4111 among the at least one metal portion; the first leg 412 connected to one end of the front 411 through a first hinge 421, and including a second metal portion 4121 among the at least one metal portion; the second leg 413 connected to an other end of the front 411 through a second hinge 422; a PCB 430 including a ground portion 431 electrically connected to the first metal portion 4111, the PCB 430 positioned inside the first leg 412; an antenna structure 440 including a radiating element 441 and a feeder 442 electrically connected to the radiating element 441; a first switch circuit 451 configured to electrically connect or disconnect the first metal portion 4111 and the second metal portion 4121; and a controller 460 configured to control the first switch circuit 451.

In various embodiments, the controller 460 may be configured to control the first switch circuit 451 to change a length of the at least one metal portion connected to the ground portion 431.

In various embodiments, the first metal portion 4111 and the second metal portion 4121 may be connected through the first hinge 421.

In various embodiments, the first switch circuit 451 may be positioned between the second metal portion 4121 and the first hinge 421.

In various embodiments, the second leg 413 may include a third metal portion 4131 among the at least one metal portion, the wearable electronic device may further include: a second switch circuit 452 configured to electrically connect or disconnect the first metal portion 4111 and the third metal portion 4131, and the controller 460 may be configured to control at least one of the first switch circuit 451 or the second switch circuit 452 to change a length of the at least one metal portion connected to the ground portion 431.

What is claimed is:

1. A wearable electronic device, comprising:
   a frame including a front, a first leg, a second leg, and at least one metal portion;
   the front with a lens connected thereto, and comprising a first metal portion among the at least one metal portion;
   the first leg connected to one end of the front through a first hinge, and comprising a second metal portion among the at least one metal portion;
   the second leg connected to an other end of the front through a second hinge;
   a printed circuit board (PCB) comprising a ground portion electrically connected to the first metal portion or the second metal portion;
   an antenna structure comprising a radiating element and a feeder electrically connected to the radiating element, the antenna structure electrically connected to the ground portion;
   a first switch circuit configured to electrically connect or disconnect the first metal portion and the second metal portion or to change an impedance for connecting the first metal portion and the second metal portion; and
   a controller configured to control the first switch circuit.

2. The wearable electronic device of claim 1, wherein the controller is configured to control the first switch circuit to change a length of the at least one metal portion connected to the ground portion.

3. The wearable electronic device of claim 1, wherein the PCB is positioned inside the first leg, and the ground portion is electrically connected to the second metal portion.

4. The wearable electronic device of claim 3, wherein the first metal portion and the second metal portion are connected through the first hinge.

5. The wearable electronic device of claim 4, wherein the first switch circuit is positioned between the second metal portion and the first hinge.

6. The wearable electronic device of claim 1, wherein
   the second leg comprises a third metal portion, and
   the wearable electronic device further comprises: a second switch circuit configured to electrically connect or disconnect the first metal portion and the third metal portion or to change the impedance for connecting the first metal portion and the third metal portion.

7. The wearable electronic device of claim 6, wherein the first metal portion and the third metal portion are connected through the second hinge.

8. The wearable electronic device of claim 7, wherein the second switch circuit is positioned between the third metal portion and the second hinge.

9. The wearable electronic device of claim 8, wherein the controller is configured to control at least one of the first switch circuit or the second switch circuit to change a length of the at least one metal portion connected to the ground portion.

10. The wearable electronic device of claim 1, further comprising:
    a third switch circuit and a fourth switch circuit connecting the radiating element and the ground portion at positions adjacent to the feeder.

11. The wearable electronic device of claim 10, wherein the feeder is positioned between the third switch circuit and the fourth switch circuit.

12. The wearable electronic device of claim 10, wherein the third switch circuit and the fourth switch circuit are each configured to electrically connect or disconnect the radiating element and the ground portion or to change the impedance for connecting the radiating element and the ground portion.

13. The wearable electronic device of claim 12, wherein the controller is configured to control at least one of the third switch circuit or the fourth switch circuit to adjust at least one of a radiation pattern or a band of a radiated signal.

14. The wearable electronic device of claim 1, wherein the PCB is positioned inside the front, and the ground portion is electrically connected to the first metal portion.

15. The wearable electronic device of claim 1, wherein the first switch circuit is operable in each of an unfolded state and a folded state of the first leg and the second leg.

16. A wearable electronic device, comprising:
- a frame including a front, a first leg, a second leg, and at least one metal portion;
- the front with a lens connected thereto, and comprising a first metal portion among the at least one metal portion;
- the first leg connected to one end of the front through a first hinge, and comprising a second metal portion among the at least one metal portion;
- the second leg connected to an other end of the front through a second hinge;
- a printed circuit board (PCB) comprising a ground portion electrically connected to the first metal portion, the PCB positioned inside the first leg;
- an antenna structure comprising a radiating element and a feeder electrically connected to the radiating element;
- a first switch circuit configured to electrically connect or disconnect the first metal portion and the second metal portion; and
- a controller configured to control the first switch circuit.

17. The wearable electronic device of claim 16, wherein the controller is configured to control the first switch circuit to change a length of the at least one metal portion connected to the ground portion.

18. The wearable electronic device of claim 17, wherein the first metal portion and the second metal portion are connected through the first hinge.

19. The wearable electronic device of claim 18, wherein the first switch circuit is positioned between the second metal portion and the first hinge.

20. The wearable electronic device of claim 16, wherein the second leg comprises a third metal portion among the at least one metal portion,
the wearable electronic device further comprises: a second switch circuit configured to electrically connect or disconnect the first metal portion and the third metal portion, and
the controller is configured to control at least one of the first switch circuit or the second switch circuit to change a length of the at least one metal portion connected to the ground portion.

* * * * *